(12) United States Patent
Hirsch et al.

(10) Patent No.: US 9,342,908 B2
(45) Date of Patent: May 17, 2016

(54) INFORMATION RETRIEVAL AND PRESENTATION METHODS AND SYSTEMS

(71) Applicant: Mohio Limited, Auckland (NZ)

(72) Inventors: Christian Hirsch, Auckland (NZ); John Hosking, Kingston (AU); John Grundy, Diamond Creek (AU)

(73) Assignee: Auckland Uniservices Limited, Auckland (NZ)

( * ) Notice: Subject to any disclaimer, the term of this patent is extended or adjusted under 35 U.S.C. 154(b) by 158 days.

(21) Appl. No.: 14/047,631

(22) Filed: Oct. 7, 2013

(65) Prior Publication Data
US 2014/0098103 A1    Apr. 10, 2014

Related U.S. Application Data

(60) Provisional application No. 61/711,055, filed on Oct. 8, 2012.

(51) Int. Cl.
*G06T 11/20* (2006.01)

(52) U.S. Cl.
CPC .................................. *G06T 11/206* (2013.01)

(58) Field of Classification Search
CPC ... G06T 11/206; G06F 3/0481; G06F 17/246; H04L 12/2458; G06Q 10/10
See application file for complete search history.

(56) References Cited

U.S. PATENT DOCUMENTS

| | | | |
|---|---|---|---|
| 6,801,229 B1 | 10/2004 | Tinkler | |
| 6,867,782 B2 * | 3/2005 | Gaudette et al. | 345/530 |
| 7,719,533 B2 | 5/2010 | Nagaraj et al. | |
| 8,155,996 B1 * | 4/2012 | Cassone et al. | 705/7.36 |
| 8,427,490 B1 * | 4/2013 | Luu et al. | 345/522 |
| 2001/0049695 A1 | 12/2001 | Chi et al. | |
| 2004/0017395 A1 * | 1/2004 | Cook | 345/745 |
| 2004/0255005 A1 * | 12/2004 | Spooner | 709/218 |
| 2005/0138160 A1 | 6/2005 | Klein et al. | |
| 2008/0001948 A1 * | 1/2008 | Hirsch | 345/440 |
| 2009/0115785 A1 | 5/2009 | Grandhi et al. | |
| 2010/0312769 A1 * | 12/2010 | Bailey et al. | 707/740 |
| 2012/0054192 A1 * | 3/2012 | Song et al. | 707/741 |
| 2013/0325792 A1 * | 12/2013 | Shiffer et al. | 707/602 |

OTHER PUBLICATIONS

Hirsch, C.J. 2011 "The Visual Wiki: A New Metaphor for Knowledge Access and Management" *Phd Thesis—The University of Auckland*.
Hirsch, C.J. et al. 2009 "The Visual Wiki: A new Metaphor for Knowledge Access and Management" *Proceedings of the 42nd Hawaii International Conference on System Sciences* (10 pages).

(Continued)

*Primary Examiner* — Todd Buttram

(74) *Attorney, Agent, or Firm* — Knobbe, Martens, Olson & Bear, LLP

(57) ABSTRACT

The present invention provides a networked computer system for retrieving and displaying information, comprising a front-end sub-system and a back-end sub-system. The back-end comprises one or more selectable pipelines for processing the user query, each comprising one or more component software modules selected from a library of modular component software modules having predefined functions or created by a user to cooperate in extracting and processing extracted data, wherein at least one of the one or more pipelines may be customized by modifying either or both of a selection or sequence of the component software modules.

24 Claims, 18 Drawing Sheets

(56) References Cited

OTHER PUBLICATIONS

Hirsch, C.J. et al 2010 "VikiBuilder: End-user Specification and Generation of User Wikis" *ASE '10: Proceedings of the IEEE/ACM International Conference on Automated Software Engineering*, pp. 13-22.

Hirsch, C.J. et al 2010 "VikiBuilder: ThinkFree: Using a Visual Wiki for IT Knowledge Management in a Tertiary Institution" *WikiSym '10*, 10 pages.

Hirsch, C.J. et al. 2010 "VikiBuilder: Let's build a Visual Wiki" *Poster Presented at ASWEC Conference*.

Hirsch, C.J. et al. 2009 "Interactive Visualization Tools for Exploring the Semantic Graph of Large Knowledge Spaces" *Workshop on Visual Interfaces to the Social and the Semantic Web*, Sanibel Island, Florida, 6 pages.

Hirsch, C.J. et al. 2008 "VikiBuilder: Thinkbase: A Visual Semantic Wiki" *International Semantic Web Conference (Posters & Demos)*.

Su, M.T. et al. 2009 "KaitoroBase: Visual Exploration of Software Architecture Documents" *Proceedings of the IEEE/ACM International Conference on Automated Software Engineering*: 653-655.

* cited by examiner

INFORMATION RETRIEVAL AND PRESENTATION METHODS AND SYSTEMS

FIELD OF THE INVENTION

This invention relates to methods, computer programs, and systems for retrieving and presenting information. More particularly, the invention relates to the selection and retrieval of information from one or more data sources, conversion of the selected information into a standard format, and presentation of the information in a graph- or chart-like diagram indicating the relationship between the information.

BACKGROUND

Information technology provides access to a vast source of information. One of the difficulties in locating and navigating that information, however, is the inconsistent or inconvenient way in which that information is often organised and presented. In particular, it is difficult to quickly appreciate how one source of information is related to another, identify the relevant sources, and to navigate between those sources in a logical and intuitive manner.

Hypertext documents are an example of one form of presenting information for which navigation and visualizing relationships can be troublesome. Websites such as Wikipedia (on the World-Wide-Web at wikipedia.org) and Freebase (on the World-Wide-Web at freebase.com), for example, comprise large collections of interrelated pages or articles each comprising information on a particular topic. That information in many cases is commonly arranged into a plurality of sub-topics. In many cases, detailed information on each sub-topic will alternatively or additionally be provided in a separate page or article dedicated to that sub-topic. A hyperlink to the dedicated sub-topic page will therefore commonly be provided in the body of the parent topic page.

In navigating such information sources, it is commonly necessary to depart from the original topic page to obtain the required information from one or more other distinct yet related pages. However, each sub-topic is often a legitimate topic in its own right, with hypertext links both to and from other related topics. Accordingly, it may not be possible or practical to arrange the information in a strictly hierarchical fashion, for example, to enable the logical navigation of the related pages using an index, table of contents, site map, or other such outline or summary of topics and sub-topics, as might be convenient for a particular user. Rather, such data sources more commonly have a "flat" structure navigated by searching for the initial topic and following hyperlinks to related topics or sub-topics. To find the required information, the user may be required to follow several hyperlinks which may involve trial and error. The user thus invariably relies on the history of their Web browser to go "back" to a previous page before following another hyperlink, and may become waylaid or distracted by unrelated pages.

Legislation is another example of a source of information which can be difficult to navigate. Provisions of legislation may be arranged into a plurality of parts, sub-parts, sections, sub-sections, paragraphs and the like, with provisions often referring to other areas of the legislation. One provision may comprise a reference to another related provision and/or include words defined elsewhere in the legislation, for example. Accordingly, upon reading one provision it is often necessary to refer momentarily to another to fully understand the meaning, context, or effect of the provision. A table of contents is of limited value in such circumstances, and there is presently no convenient means for quickly and logically navigating the legislation, and in particular providing a visual indication of the relationships between different provisions of the legislation.

Existing systems for visually representing data are generally specifically adapted for visually representing a particular type of data or limited to operating with a specific data source. Such systems are inflexible and cannot be easily adapted for use with other types of data or for compatibility with different data sources, and provide only limited, if any, scope for customisation or extension, in particular for end-users who may be unfamiliar with the required programming techniques and/or may not have access to the source code.

Accordingly, there is a need for an improved interface for presenting information which visually indicates the relationship and enabling intuitive navigation between related topics, and in particular a system which can be easily customized.

OBJECT OF THE INVENTION

It is therefore an object of the invention to provide a method and/or computer system which overcomes or at least ameliorates one or more disadvantages of the prior art, or alternatively to at least provide the public with a useful choice.

Further objects of the invention will become apparent from the following description.

SUMMARY OF INVENTION

In one aspect the invention may broadly be said to consist in a computer system for retrieving and displaying information, the system comprising:

a front-end sub-system for receiving a user query and displaying a response to the user;

a back-end sub-system in communication with the front-end for receiving data relating to the user query, extracting data from one or more data sources based on the user query data, processing said extracted data into a predefined format, and transmitting said processed data to the front-end for display to the user in response to the query, wherein the front-end is adapted to display the processed data diagrammatically in an interactive graphical user interface comprising a plurality of nodes, each node graphically representing a corresponding item relating to the user query, and said nodes being arranged in relation to one another to reflect a relationship between said items, wherein each of said nodes are selectable by the user to display information and/or further items related to the item of the selected node.

Preferably said items comprise topics, and said nodes are arranged in relation to one another to reflect the contextual relationship between said topics. In particular, the front-end preferably displays the processed data as a graph or similar visual representation comprising a parent node representing a topic relating to the user query, and one or more child nodes representing topics related to that of the parent node, said child nodes radiating from the parent node and connected therewith by an edge. Each child node may in turn comprise a parent node to further child nodes radiating therefrom. Each child node may have one or more parent nodes.

Alternatively, said nodes may be arranged in relation to one another to reflect a temporal or spatial relationship therebetween. More particularly, the nodes may for example be arranged in a diagram comprising a timeline or map, respectively.

Preferably said predefined data format comprises a data structure of format suitable for a conversion into a graph. The data structure may comprise a graph object comprising a plurality of node and edge objects, for example.

Preferably the back-end sub-system comprises one or more pipelines for processing the user's query, each pipeline comprising at least one component software module selected from a library of modular component modules having pre-defined functions, or created by a user. In particular, at least one of said selected component modules comprises an adapter software module adapted to communicate with a data source by transmitting said query and receiving said extracted data in respective predetermined formats of the data source, and to convert said extracted data into a predefined format for further processing by the back-end sub-system. The further processing may comprise processing by one or more further component software modules in the pipeline, and/or conversion of the processed data into a transmission format for transmission to the front-end sub-system. Preferably the one or more further component software modules are each adapted to receive and transmit data in said predefined format, wherein communication between said component modules occurs in said predefined format irrespective of the predetermined formats of the data source and/or transmission format.

The transmission format is preferably any format suitable for transmitting the processed data to the font end, most preferably by HTTP, such as JavaScript Object Notation (JSON) format.

The back-end sub-system preferably comprises a plurality of pipelines, wherein each pipeline has a different function determined by the selection and sequence of component modules.

Preferably one or more of said pipelines further comprises two or more component software modules selected from the library or created by the user. The library is preferably extendible, and may comprise component software modules selected from the group consisting of at least:
  aggregator component modules, which manipulate graph data and group together all sets of nodes that are connected by the same type of edges;
  merger components which are adapted to merge two or more graph objects into a single graph object;
  threshold components which limit the number of children nodes associated with each parent node in a graph object; and
  adapter components which are adapted to communicate with an external data source, and to convert data between the format of the data source and a graph object.

Preferably said pipelines are reconfigurable by the user by selecting and arranging a sequence of said modular component software modules from the library. The pipelines may be configured by editing a pipeline configuration file, or by accessing a configuration interface. The configuration interface preferably displays the or each pipeline as a graph, wherein each component software module is represented by a node and the sequence of the components is represented by edges therebetween.

Preferably the back-end further comprises a pipe-line controller, wherein the pipe-line controller selects a pipeline from the one or more pipelines to process the user's query. The pipeline is preferably selected on the basis of the received data relating to the user query, which is preferably based upon an action performed by the user (such as selecting the "Search" button of the searching interface 102).

Preferably the front-end and back-end systems comprise computer programs which, when executed, cause a computer to perform respective functions of the system. More particularly, the system preferably has a client-server architecture, wherein the front-end sub-system comprises a first computer program executed by a client computer system, and the back-end sub-system comprises a second computer program executed by a server computer system. The client system preferably comprises a personal computing device operated by the user. The personal computing device may comprise a general-purpose desktop or laptop computer, or a mobile computing device such as a smartphone or tablet, for example. The server system preferably comprises one or more servers in communication with the front-end by way of a computer network. The one or more servers may comprise at least a Web server in communication with the one or more data sources by way of a computer network. The (or each) network may comprise a wired and/or wireless local area network (LAN), wide area network (WAN), the Internet, or a combination thereof.

In a second aspect, the invention may broadly be said to consist in a computer system for retrieving and displaying information, the system comprising:
  a front-end sub-system for receiving a user query, generating and transmitting a request comprising data defining the user query, and displaying a response to the user;
  a back-end sub-system in communication with the front-end for receiving the request, extracting data from one or more data sources based on the user query data, processing said extracted data into a predefined format, and transmitting said processed data to the front-end for display to the user in response to the query,
  wherein the back-end comprises one or more pipelines for processing the user's query, each pipeline comprising at least one component software module selected from a library of modular component software modules or created by a user, and each pipeline having or communicable with one or more of said data sources and configured to adapt said query to be compatible therewith and/or to define parameters of the query and/or the response thereto, and wherein the request comprises data to select a pipeline for processing the user's query and/or control the selected pipeline.

In a third aspect, the invention may broadly be said to consist in a server computer system for retrieving and transmitting information relating to a user query received from a client computer system, the server computer system comprising:
  a plurality of pipelines for processing the user query and/or data relating to the user query, wherein the plurality of pipelines each comprise one or more component software modules selected from a library of modular component software modules or created by a user, and each pipeline having or communicable with one or more data sources and configured to adapt said query to be compatible therewith and/or to define parameters of the query and/or the response thereto; and
  a pipeline controller for selecting one of said plurality of pipelines for processing the user query on the basis of the user query.

In a fourth aspect, the invention may broadly be said to consist in a method performed by a server computer system for retrieving and transmitting information relating to a user query, the method comprising:
  receiving a request comprising data defining the user query, from a client computer system communicatively coupled to the server computer system;
  selecting one of a plurality of pipelines for processing the request, wherein said pipelines each comprise one or more component software modules having predefined functions selected from a library of modular component software modules or created by a user;

using the selected pipeline to extract data from one or more data sources based on the request and using the selected pipeline to process said extracted data into a predefined format; and transmitting said processed data to the client computer system for display to the user in response to the user query.

Preferably, the component software modules each operate on data in a common format and the method comprises converting data retrieved from one or more data sources having one or more data formats into the common data format. The common format may be a defined set of data types, data objects or data structures.

Preferably the predefined format defines a plurality of related nodes each connected or linked to at least one other related node by an edge, wherein each node represents an item related to the user query.

In a fifth aspect, the invention may broadly be said to consist in a method performed by a client computer system for displaying information relating to a user query, the method comprising: receiving an input from a user defining a user query;

generating a request defining the user query;

transmitting the request to a server system;

receiving a response comprising information relating to the user query from the server system; and displaying said information as a graph comprising a parent node representing an item relating to the user query, and one or more child nodes representing items related to that of the parent node, said child nodes radiating from the parent node and connected therewith by an edge.

Preferably one or more of the child nodes comprises a parent node to one or more further child nodes.

Preferably the request defines one of a plurality of pipelines of the server system for processing the request, based upon the user input.

Those skilled in the art will appreciate that hardware used to implement systems according to the present invention may be distributed or concentrated as desired without invention based on system requirements and/or administrator preferences, with known communication means used to relay data between different elements, if required. For example, the servers, data sources, databases, processors and other elements may be concentrated largely into a single said computer system or separate (either co-located or geographically dispersed) computer systems as desired and depending on system limitations and requirements.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Figure 1:
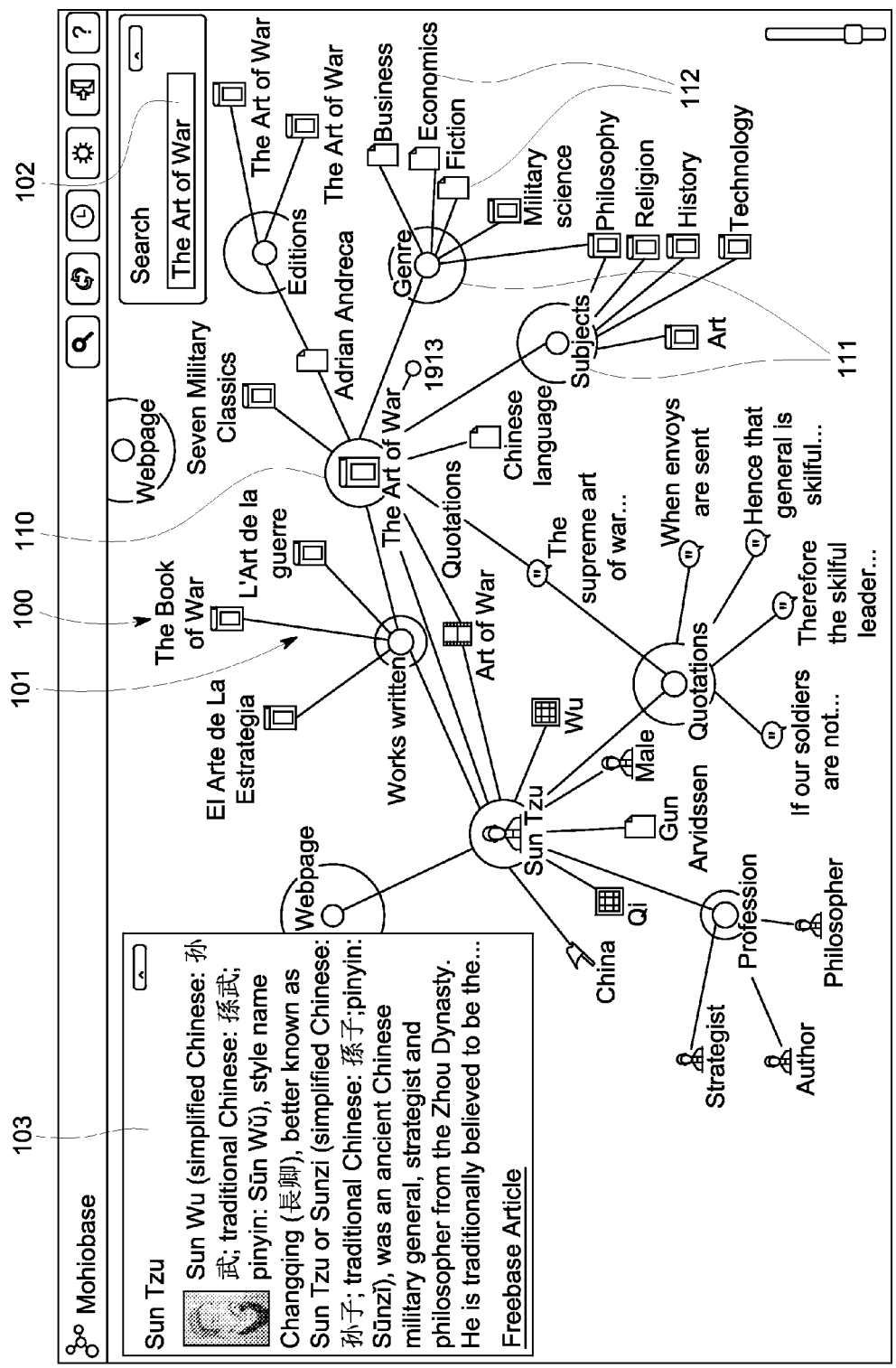
FIG. 1 is an example of a graphical user interface produced by a first embodiment of a computer system according to the invention.
Figure 2A:
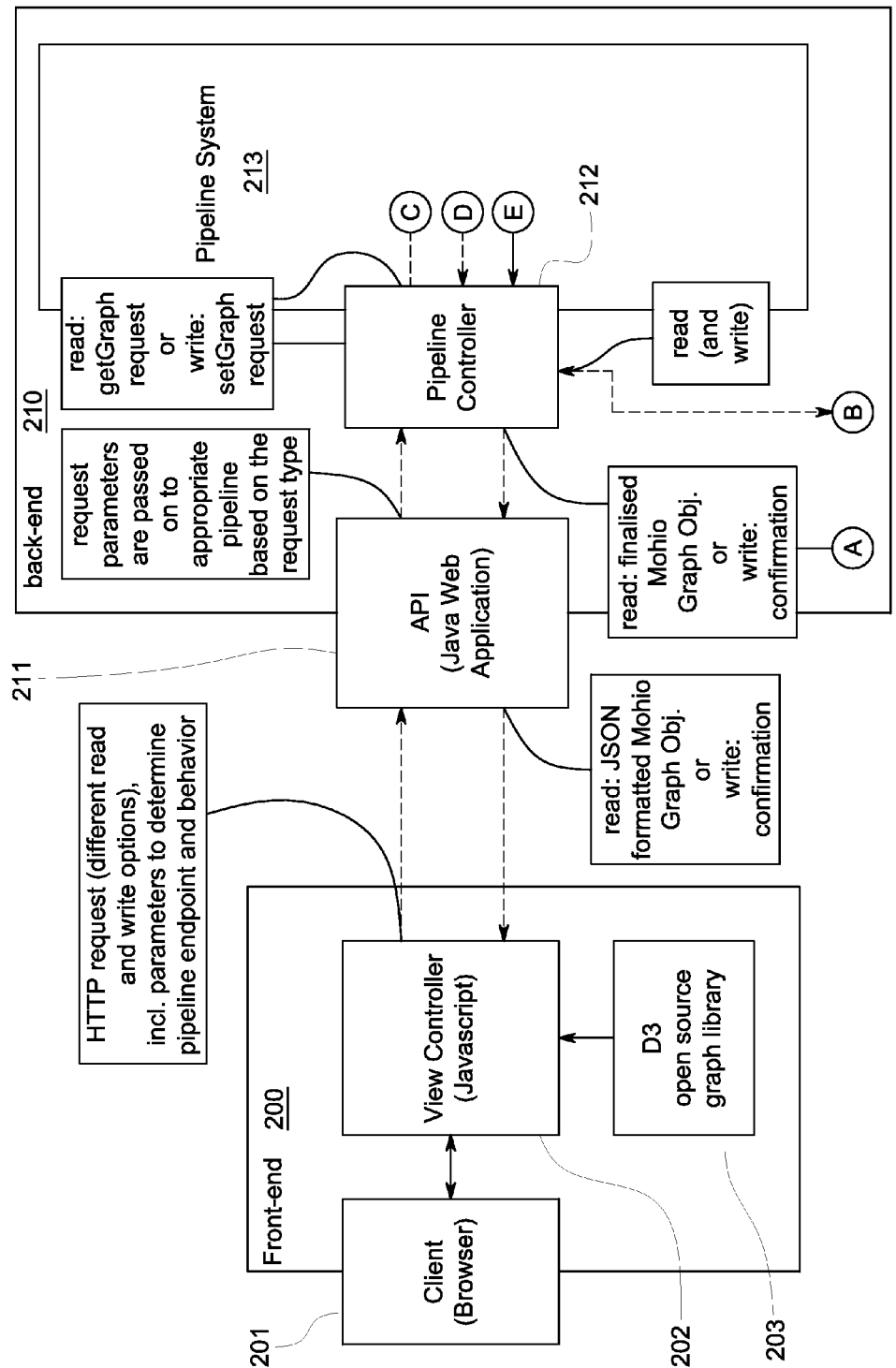
FIG. 2A-2D is a general system diagram of a computer system according to the present invention.
Figure 2B:
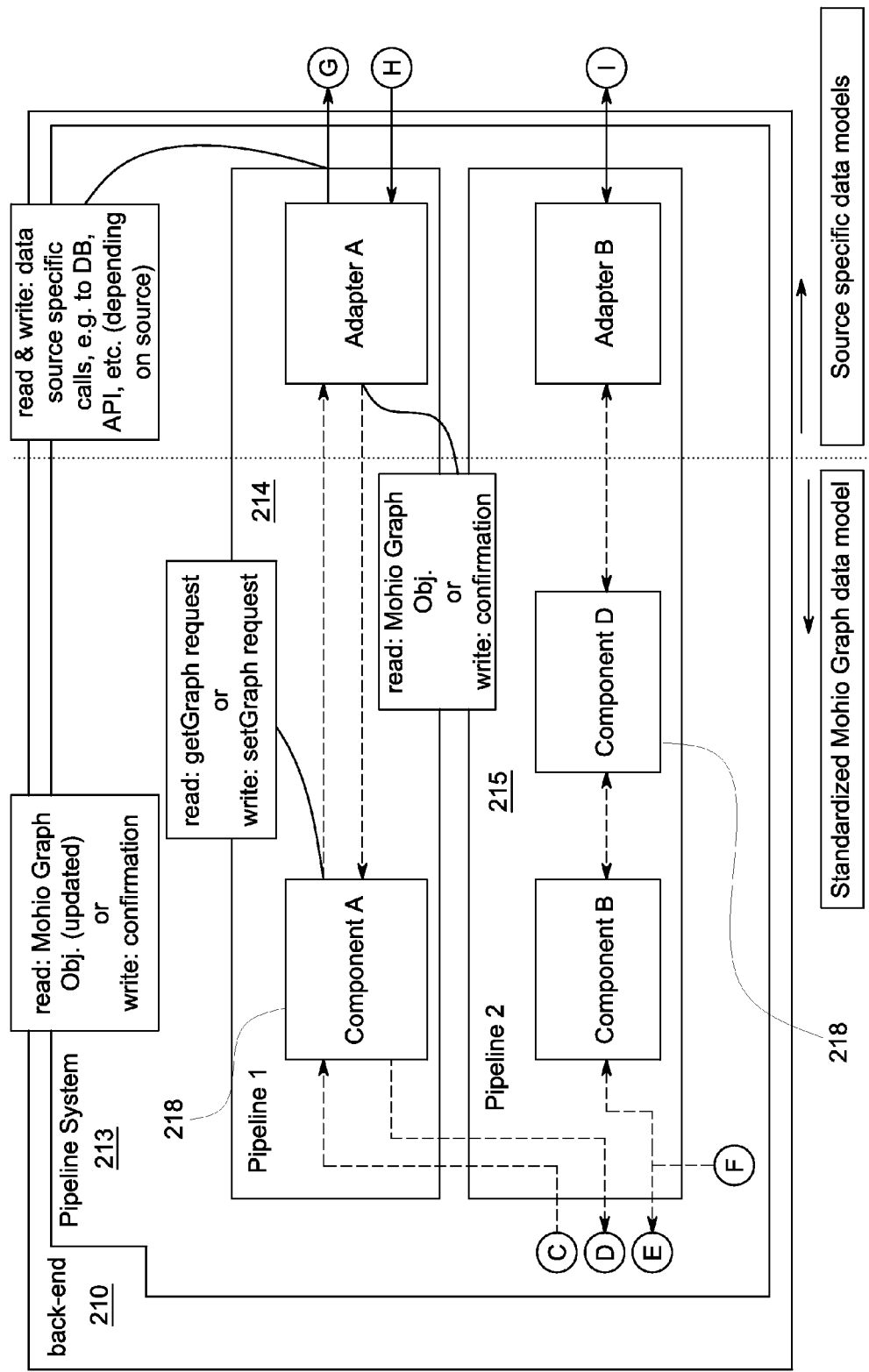
Figure 2C:
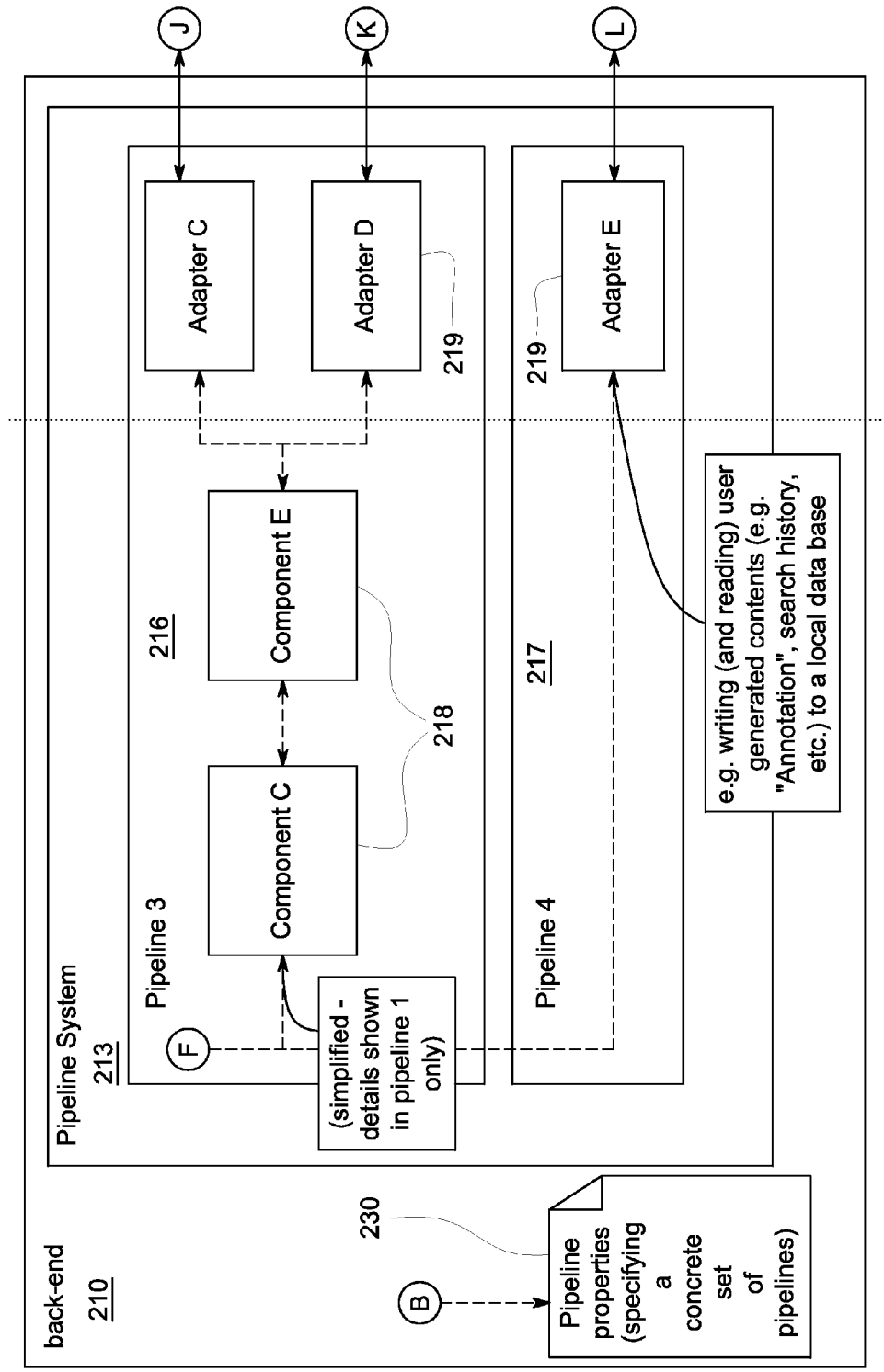
Figure 2D:
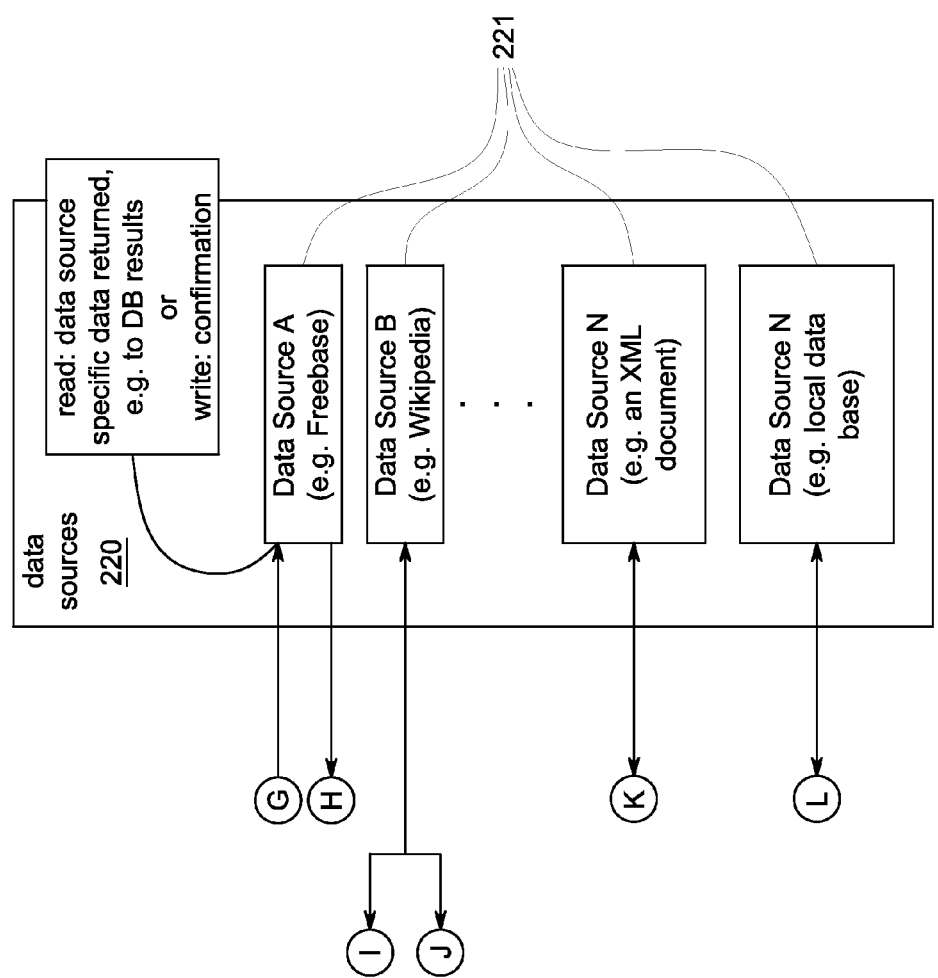

Throughout the description like reference numerals will be used to refer to like features in different embodiments.

Referring first to FIG. 1, there is shown an example interactive graphical user interface (GUI) according to the present invention, in which the relationship between various topics or sub-topics (or, more generally, the relationship between "items") is illustrated by a diagram which, in this case, comprises a mind map-like graph of "nodes" 100 connected to each other by "edges" 101. The GUI is presented to the user via an electronic visual display which may comprise a cathode ray tube (CRT) monitor, liquid crystal display (LCD), or any equivalent or alternative display of a digital computer device. A user can preferably interactively manipulate (move, zoom, select, filter etc.) the display to explore the data in different ways, using a human interface device (HID).

In this example, the interface is displaying the result of a search of the structured information repository "Freebase" (on the World-Wide-Web at freebase.com) for the topic "The Art of War". The interface initially provides a graph centred on the parent node 110 entitled "The Art of War", representing the Freebase article on that topic. A plurality of sub-topics or categories of information relating to that topic are represented by a plurality of child nodes 111 which radiate from the central parent node 110, entitled "Webpage", "Editions", "Genre" and "Subjects". Each child node 111 may in turn comprise a parent node to further child nodes 112 representing information or articles (or potentially further sub-topics) appropriately grouped together under the relevant parent node 111, and so on. The further child nodes 112 in this example include the nodes entitled "Technology", "Competition" and "History" which depend from the parent "Subjects" node 111.

A user, having searched for the initial topic using the searching interface 102 via a human interface device, can selectively collapse or expand the various nodes to respectively hide or display any child nodes depending therefrom. The number and type of child nodes depending from a superior node will depend upon the topic of the superior node. For example, the primary node "The Art of War" concerns a book, whereas the node "Sun Tzu" concerns a person, in this case the author of the book searched. The child nodes depending from these parent nodes will thus vary accordingly, dependent upon the category of the topic and/or the content of information available for that topic. The number and/or type of child nodes depending from two primary nodes both concerning people (or more specifically, authors), for example, would typically be more similar.

Having thus navigated the available topics relating to the search query, the user can view further information on a particular topic by selecting the corresponding node to display the information in the information display area 103. In the example, it can be seen that focus is upon the topic node "Sun Tzu", author of the "The Art of War". The Freebase article on Sun Tzu, or an extract thereof, is displayed in the information display area 103. The initial topic node for "The Art of War" also remains expanded to show other topics also related to the initial query which the user can view by selecting the corresponding node using a human interface device such as a mouse, keyboard, touch pad, touch screen, or the like. The user may also visually manipulate the interface by selectively minimising or restoring the search interface 102 or information display area, moving the graph, or zooming in and out, for example.

The present invention thus involves the transformation of information (typically predominantly textual information, such as articles on a topic) received from one or more data sources into a visual representation of a plurality of related topics which are displayed diagrammatically in an interactive graphical user interface.

The user interface of the present invention may be implemented by a computer system having the preferred architecture shown generally in the system diagram of FIG. 2. The system as a whole generally consists of 3 parts:
 1. A front-end (presentation of the interface to an end-user) sub-system 200;
 2. A back-end (the application logic, which mainly consists of a "pipeline system" in charge of making data accessible and usable to the front-end) sub-system 210; and
 3. Data Sources (a set of possible data sources, which could be quite diverse, e.g. database, web service, documents, etc.) 220.

The front-end 200 comprises the client software 201, view controller 202, and graph library 203 which together process search requests and receive and display the resulting data received from the back-end. The front-end sub-system is preferably implemented by a client computer system programmed to transform data received from the back-end sub-system into a diagram indicative of the relationship between various related topics, as shown by way of example in FIG. 1. The client computer system preferably comprises at least a processor, human interface device, and a network communication device.

The client software 201 preferably comprises a standard web browser (such as MICROSOFT® Corporation's WINDOWS® INTERNET EXPLORER® 9, MOZILLA FIREFOX® 15, Google, Inc.'s GOOGLE CHROME™ or APPLE® Inc.'s SAFARI® browsers, for example), but the system may alternatively comprise a specialized stand-alone computer program without departing from the scope of the invention. A stand-alone computer program, for desktop, tablet, or smartphone devices for example, may also incorporate at least some of the functions of the back-end, including the pipelines (a chain of processing elements arranged so that the output of each element is the input of the next), described in further detail below.

In the preferred browser-based embodiments of the front-end sub-system, the view controller 202 may comprise a client-side JAVASCRIPT™ Web application, for example, but any alternative Web application framework suitable for providing the interactive aspects of the inventive interface in a web browser may be used without departing from the scope of the invention.

The client-side layout or graph library 203 may be implemented using any suitable client-side technology, such as JAVASCRIPT™ or others. The graph library 203 comprises one or more graph layout mechanisms to display data to the user in the required form, and may be a proprietary library developed specifically for use with the present invention, or an existing open-source or commercial library package.

The back-end sub-system 210 comprises an application programming interface (API) 211, pipeline controller 212, and modular pipeline system 213 with interchangeable component software modules. In use, the back-end 210 receives a user's request and extracts information from a particular data source based upon the request parameters. The back-end sub-system is preferably implemented by a server computer system programmed to transform data extracted or retrieved from the data sources into a standard data format which facilitates presentation of the data by the front-end as described above. The server computer system preferably communicates with the client computer system by a computer network which may comprise a wired or wireless local area network (LAN) and/or the Internet, and therefore comprises a suitable network communication device.

A pipeline controller 212 receives search or request parameters from the user via API 211, and interfaces with the or each pipeline in the pipeline system 213.

Each pipeline comprises one or more modular or "pluggable" components 218 in various configurations, including at least one adapter component 219. The illustrated pipeline system 213 in this case comprises four different pipelines 214-217 by way of example, but it is to be appreciated that the pipeline system 213 may comprise any number of pipelines.

Figure 3:
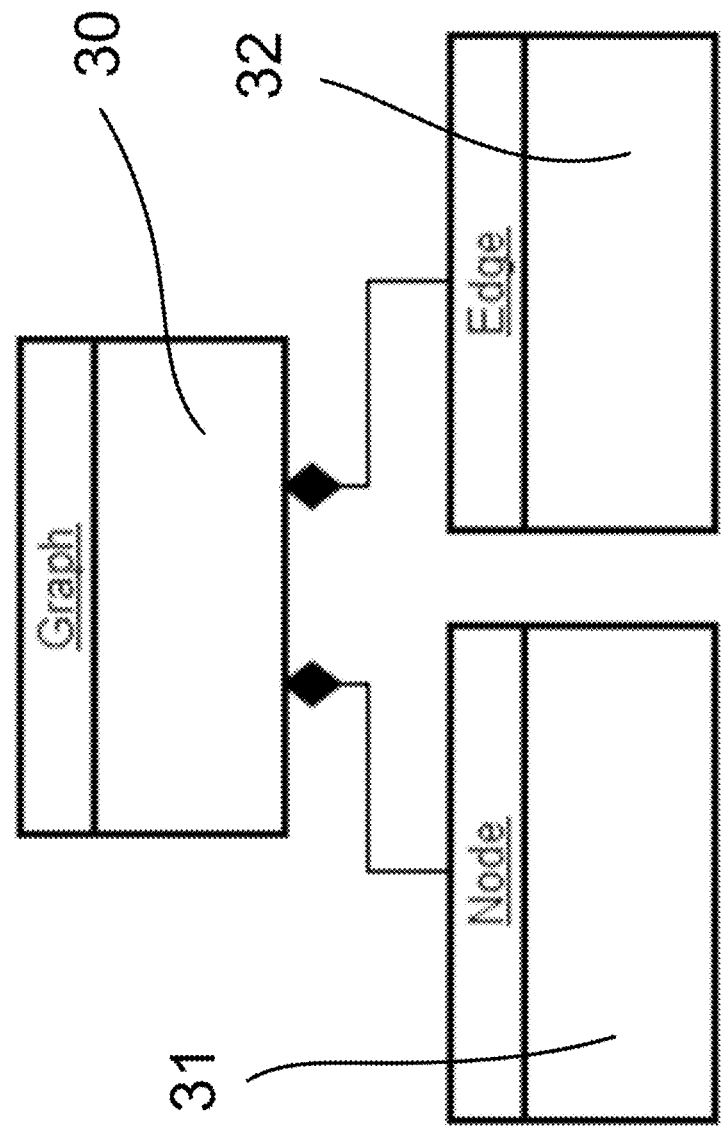
FIG. 3 is a class diagram showing the relationship between the Graph, Node and Edge classes of the present invention.

All communications between components and adapters of the pipeline system 213 are in a common data format to allow the modularity of the system which enables the selection of various different component software modules from a library independent of the data format of the data source(s). That is, the system processes and handles this very diverse original data in a unified way, agnostic of the data model specifics of the data source. An end-user is able to interact, query, and manipulate the multiple data sources and gets a seamless experience. In this example, this is achieved by passing graph objects 30 which define the graph formed in response to a user's request, and comprises any number of "node" 31 and "edge" objects 32 as shown in FIG. 3. Each node object 31 represents a node of the graph as shown in FIG. 1 and comprises the information related to the relevant topic extracted from the data sources, while each "edge" object 32 defines the relationship or connection between nodes in the graph. Any alternative data format can alternatively be used without departing from the scope of the invention, however.

Referring again to FIG. 2, each modular software component 218 of the system is a self-contained functional element adapted to receive and process (manipulate) Graph objects to perform a predefined function, outputting a modified graph object to the next component 218 or pipeline controller 212. The modular software components 218 therefore form the building blocks of the overall function performed by each pipeline, which can be customized by modifying the combination and/or permutation of modular software components. This modularity thus enables rapid reconfiguration of pipelines and reuse of components across multiple applications.

An adapter 219 is a specialized modular component at the end of each pipeline which is adapted to communicate directly with a particular information source, and convert data received from the data source in response to a query into a Graph object for further processing by any other components 218 in the same pipeline. Data received from a data source associated with each adapter 219 will generally be in a predefined data format, including but not limited to XML, JSON, SQL, or HTML, for example, dependent upon the particular data source 221. Adapter modules may also be provided for writing data to the data source.

The API 219 receives graph objects from the pipeline(s) and provides the data to the view controller 202 of the front-end sub-system 200 in an appropriate transmission format. The data may be transmitted (via a network communication device in communication with a similar device of the front-end sub-system) by hypertext transfer protocol (HTTP) in JavaScript Object Notation (JSON) format, for example, but alternative formats may alternatively be used without departing from the scope of the invention.

The data sources 220 part of the system comprises at least one data source 221. Each data source 221 is associated with at least one adapter 219, and may be associated with adapters in multiple pipelines (see, for example, Adapters B and C and Data Source B in FIG. 2.

Depending upon the application of the system, the or each data source 221 may comprise an external or remote source of information (i.e. accessed via the internet) such as Wikipedia or Freebase, a single document or collection of documents in a particular format such as XML, or a local database (i.e. in the same computer or local area network as the server system implementing the back-end 210 of the present invention).

Figure 4:
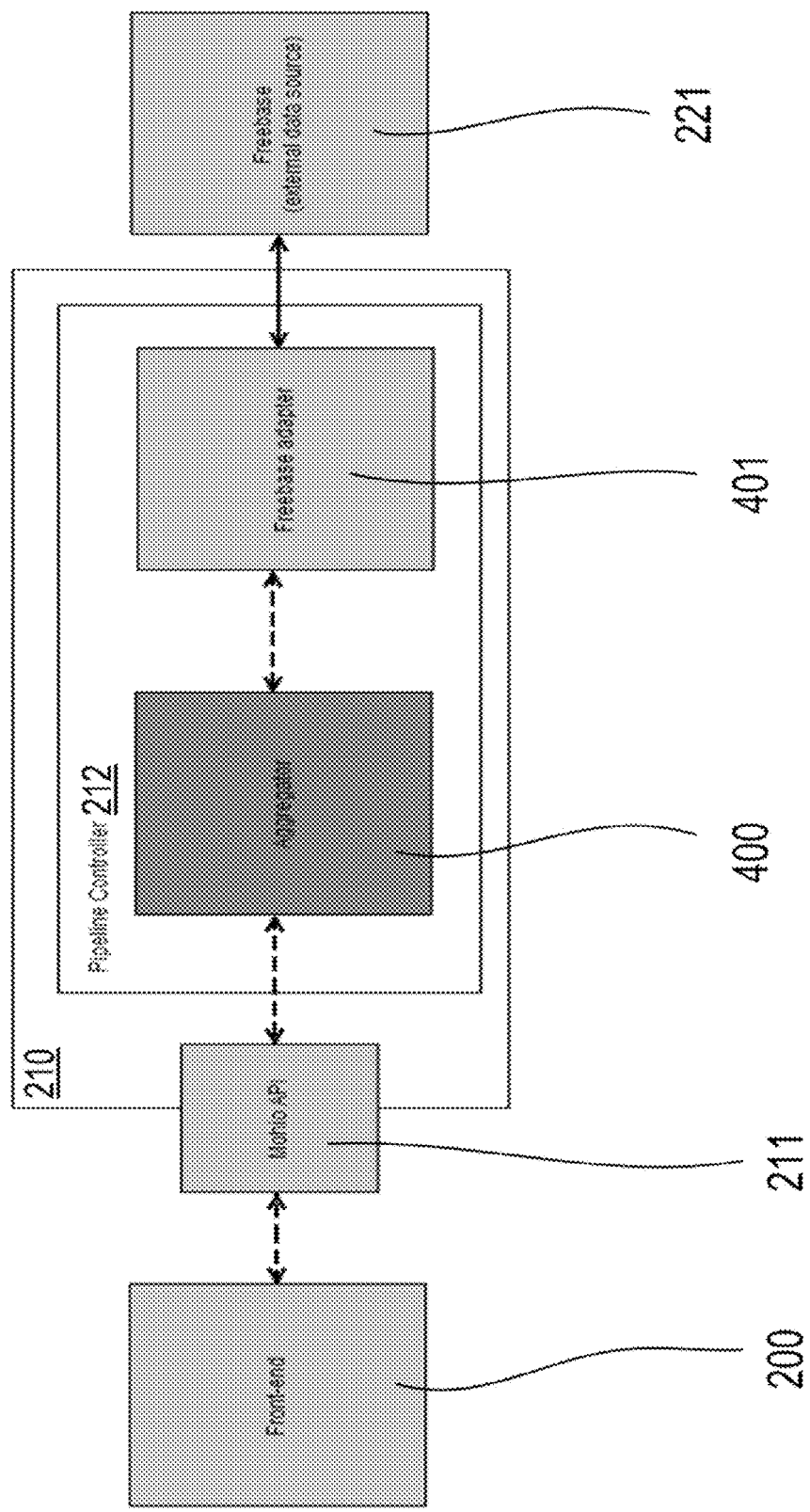
FIG. 4 is a system diagram of a computer system according to the first embodiment of the invention.

The architecture and operation of the system is described in further detail with reference to a specific embodiment as shown in FIG. 4, in which the system is adapted to provide an interactive GUI for the Freebase web-based general knowledge repository as shown by way of example in FIG. 1.

The system in this case comprises a single pipeline including an "Aggregator" component 400 and Freebase adapter 401.

As described above with reference to FIG. 1, the user navigates by selecting nodes of the graph presented via the browser interface. Selecting a node triggers the JavaScript-based front-end 200 to send a request to the back-end 210 by making an API call to the back-end API 211. In at least some embodiments of the invention, this may comprise a URL such as the following hypertext transfer protocol:

example-address.com/MohioBase/
doRead?ID=%nodeID%&pipeline=%xyz%

This example request includes two parameters (ID and pipeline), where % nodeID % is the unique ID (identification) of the selected node, and % xyz % is the unique ID of the pipeline to which the request should be directed. It will be appreciated that any number of parameters may be similarly added to the query and passed on to the appropriate pipeline components, which in turn perform their respective functionality. That functionality will generally be based, at least in part, on these parameters. Those skilled in the art will appreciate that the parameters need not necessarily be passed in the form of a URL, and any other alternative communication method may be used without departing from the scope of the invention.

The back-end 211 of the system receives this request, and the pipeline controller 212 passes it along to the first item in the chain of the selected/default pipeline, which in this case is the Aggregator component 400. The aggregator component passes the request again to the next component, which is the Freebase adapter 401. The Freebase adapter receives the ID of the Freebase page which it needs to process. Using the Freebase API, the adapter 401 retrieves the structured data from the Freebase server.

The Freebase adapter 401 receives the retrieved data, and converts it to a graph object, which holds graph information including nodes and edges and the information they hold such as ID, title, type, image, URL, and description.

The resulting graph object is returned to the Aggregator component 400, an example of many possible such "transformation" components, which iterates through the nodes in the graph and groups the nodes together based on their types (creating an "aggregated" graph representation). The updated graph is then returned to the pipeline controller 212 and API 211, which in this example converts the final graph object into a JSON-formatted string and returns it to the front-end.

The front-end 200 processes the JSON string (or data in any other chosen transmission format) and displays it to the user as a graph, as shown by way of example in FIG. 1.

Figure 5A:
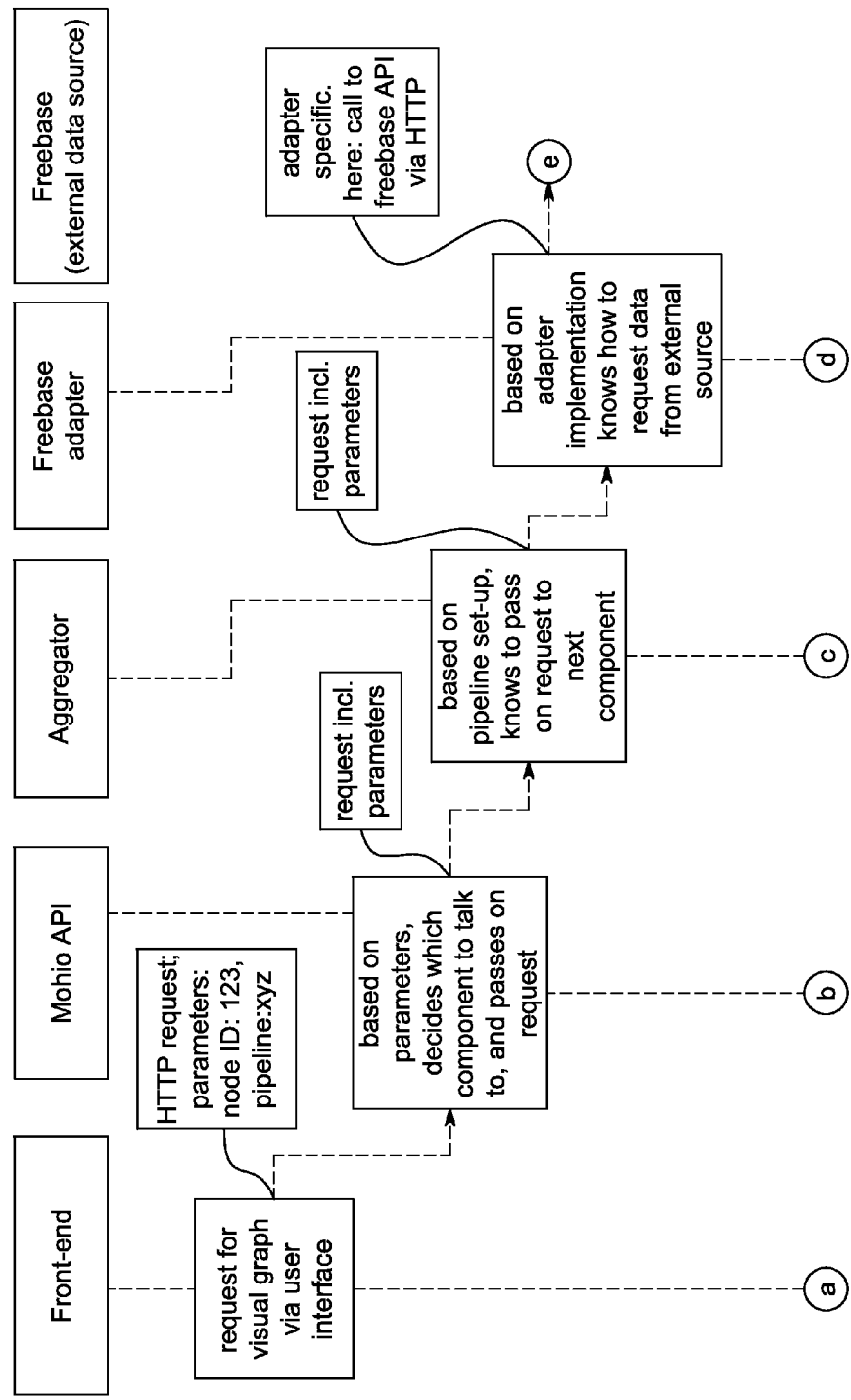
FIG. 5A-5B is a data flow diagram illustrating an example sequence of events performed by the system of FIG. 4.
Figure 5B:
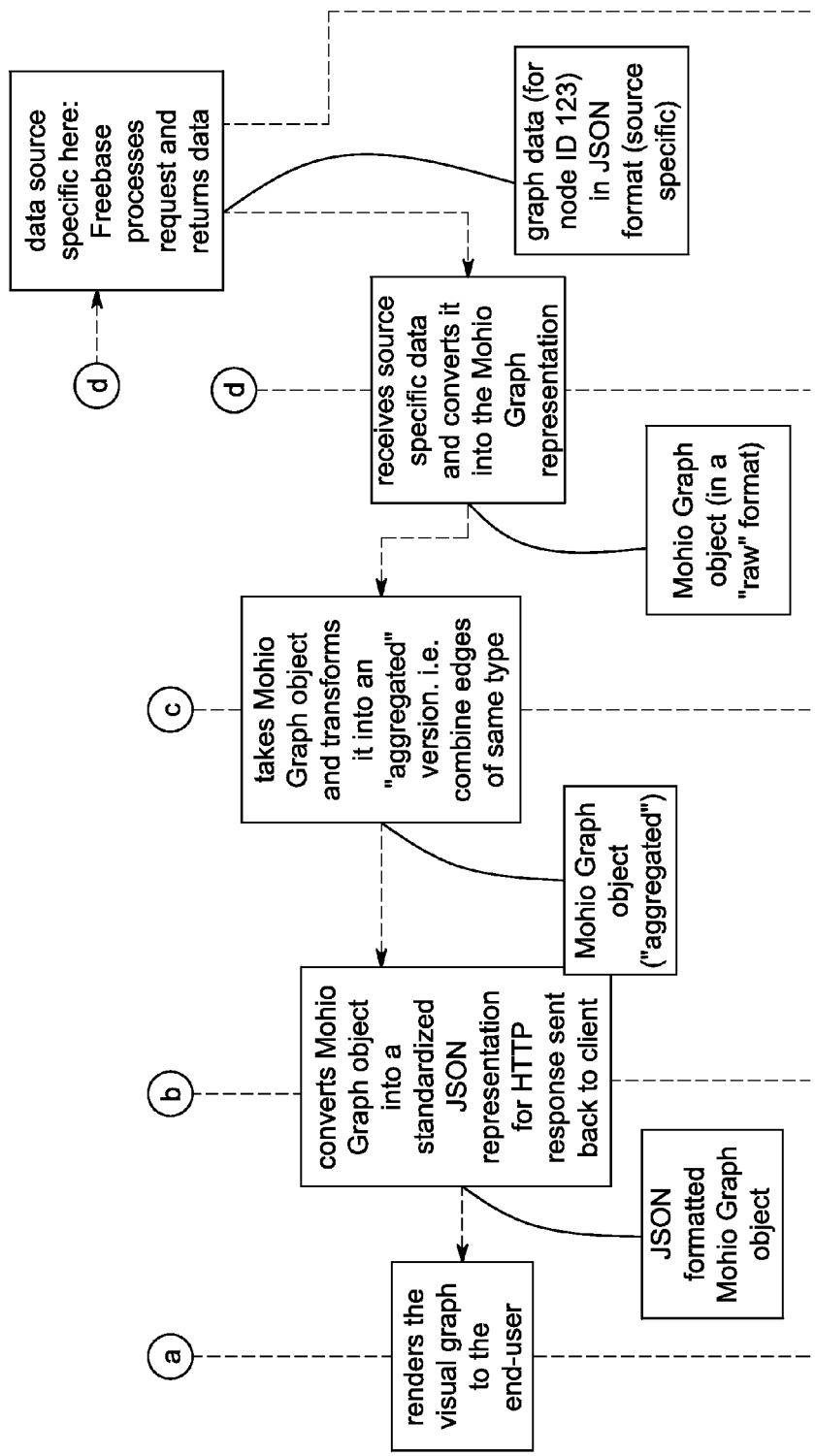

A data flow diagram illustrating the above sequence of events is provided in FIG. 5. The illustrated pipeline and example sequence relate to a "read data request" only. That is, all the calls handle requests like "give me all the data related to the node with ID: 123". Other possible requests, such as a keyword search or write request will require a different pipeline and/or sequence of events, as will become apparent from the following.

Figure 6:
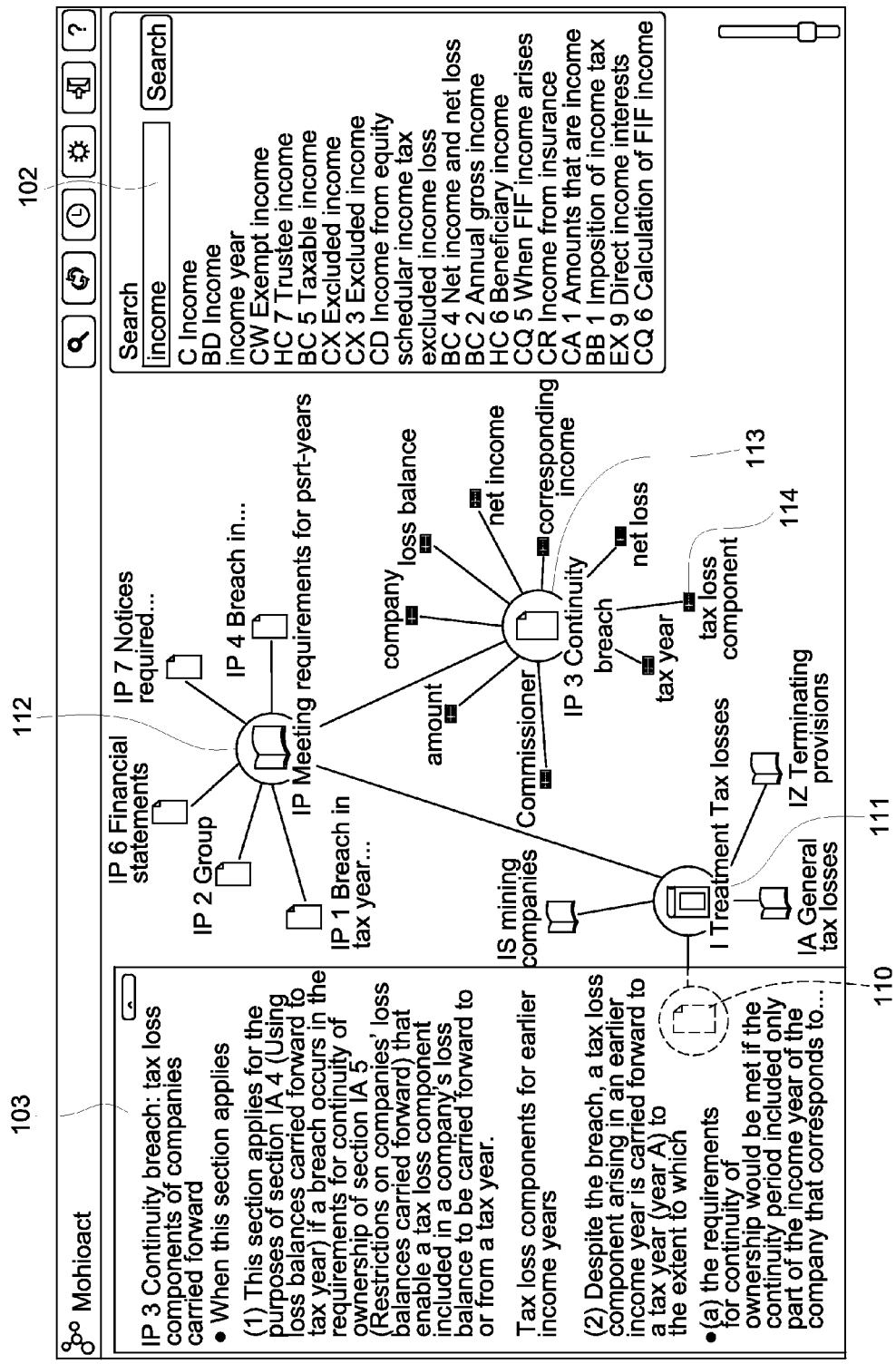
FIG. 6 is an example of a graphical user interface produced by a second embodiment of a computer system according to the invention.
Figure 7:
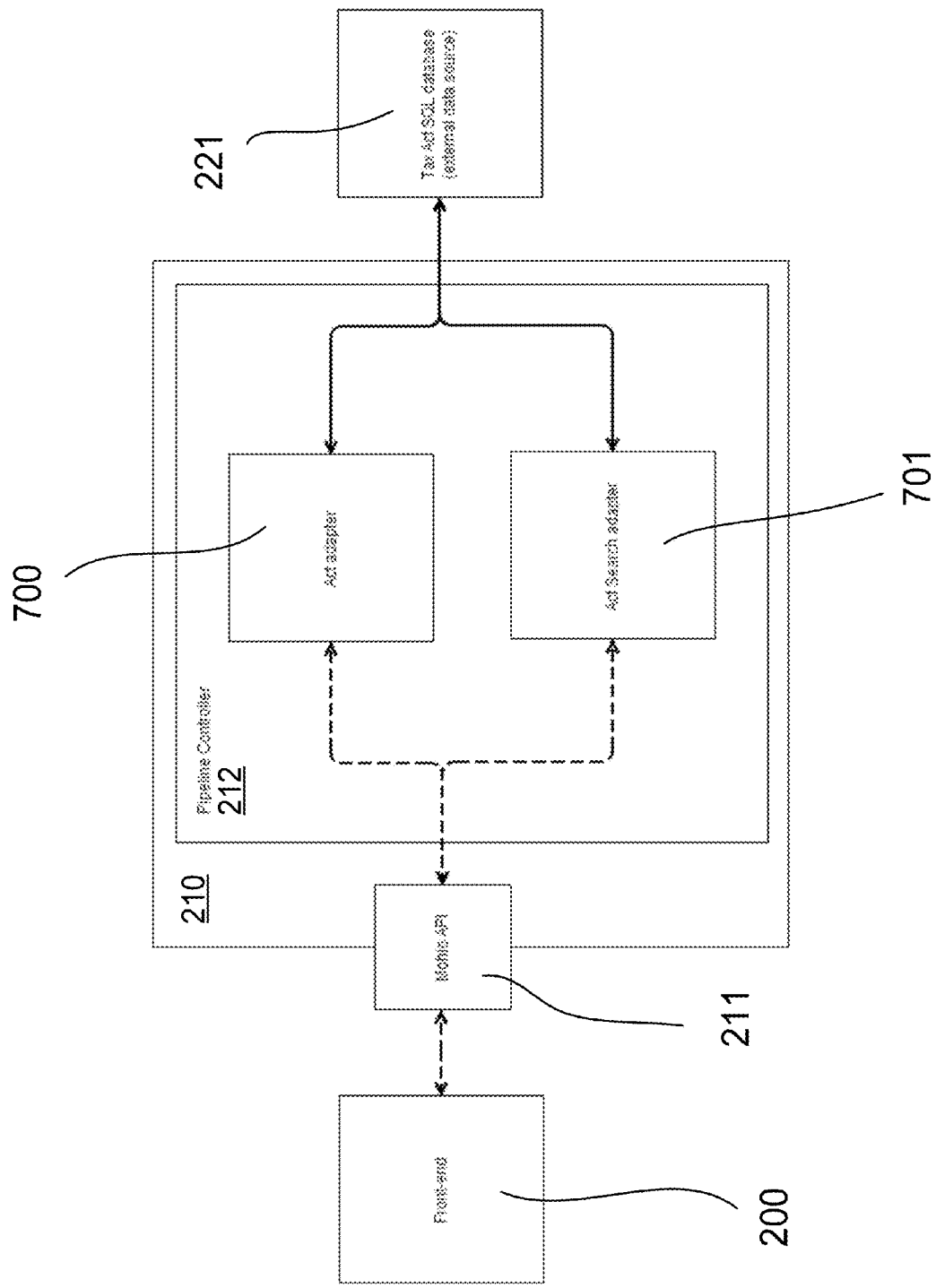
FIG. 7 is a system diagram of a computer system according to the second embodiment of the FIG. 8 is a system diagram of a third embodiment of a computer system according to the invention.

Another example system according to the present invention is illustrated in FIGS. 6 and 7. In this example, the invention is adapted to provide an interactive GUI for navigating legislation. More specifically, New Zealand Income Tax Act 2007, which is available in XML format, is stored in a local but external database.

FIG. 6 shows an example of the interactive user interface showing primary node 110 (entitled "Tax Act", partially obscured by the information display area 103), secondary node 111 (part I of the Tax Act, entitled "I Treatment of tax losses . . . "), tertiary node 112 (subpart IP of the Tax Act, entitled "IP Meeting requirements for part-years . . . "), and quaternary node 113 (section IP 3 of the Tax Act, entitled "IP 3 Continuity Breach: tax loss components of companies carried forward"). In this example, the secondary 111, tertiary 112, and quarternary nodes 113 have been selected and expanded to show the further child nodes dependent from each, including quinary nodes 114 which relate to the terms of section IP 3 defined elsewhere in the Act. The quarternary node 113 has been selected as the focus for the context information displayed in the information display area 103, which in this example comprises section IP 3 of the Tax Act.

The searching interface 102 displays the results of a search for the term "income".

A system diagram for this example embodiment of the invention is shown in FIG. 7. The system in this embodiment comprises two pipelines, the first comprising an Act adapter 700 and the second pipeline comprising Act search adapter 701. Each of these adapters are specific versions of a more generic SQL database adapter. No further components are required in either pipeline of this embodiment, as the additional step of iterating through nodes to group them together is not required.

Navigation in this embodiment is very similar to the previous example. However, rather than the adapter communicating with the Freebase API, the Act adapter queries an SQL database that contains the Tax Act data which is then processed into a graph. There is also an additional pipeline which provides the additional functionality of a searching mechanism.

In use, a user may enter a keyword or search term in the searching interface 102, initiating the following sequence of events.

The front-end 200, which in the example embodiment preferably comprises a JavaScript Web application, sends a request to the back-end by making an API call to API 211. The call may comprise a URL such as the following hypertext transfer protocol:

example-address.com/MohioAct/
doRead?GUID=%keyword%&pipelineID=
mohioactsearch where "% keyword %" is the keyword entered by the user, and "pipelineID=mohioactsearch" tells the back-end 210 to make an API call to the pipeline identified as "mohioactsearch" (i.e. the pipeline comprising Act search adapter 701) based upon the action performed by the user (in this case, searching by selecting the "Search" button of the search interface 102, or by pressing the "Enter" key on a keyboard after typing the search query, for example). As above, any alternative means for communicating parameters between the front-end and back-end may be used in place of the URL which is described by way of example only.

The back-end sub-system 210 of the system receives the search request, and the pipeline controller 212 passes along the request to the first item in the "mohioactsearch" pipeline, Act search adapter 701.

The Act search adapter 701 receives the keyword to be searched, and makes appropriate SQL queries to the SQL database 221 which contains the Income Tax Act 2007 data.

The search result is received from the SQ database 221, arranged into a single level graph, and formed into a graph object by the Act search adapter 701. The graph object is passed to the API 211, which converts the graph into a suitable transmission format, such as a JSON formatted string, which is returned to the front-end 200.

The front-end 200 processes the data received from the back-end and presents the user with the search result in searching interface 102, as shown by way of example in FIG. 6.

Figure 8:
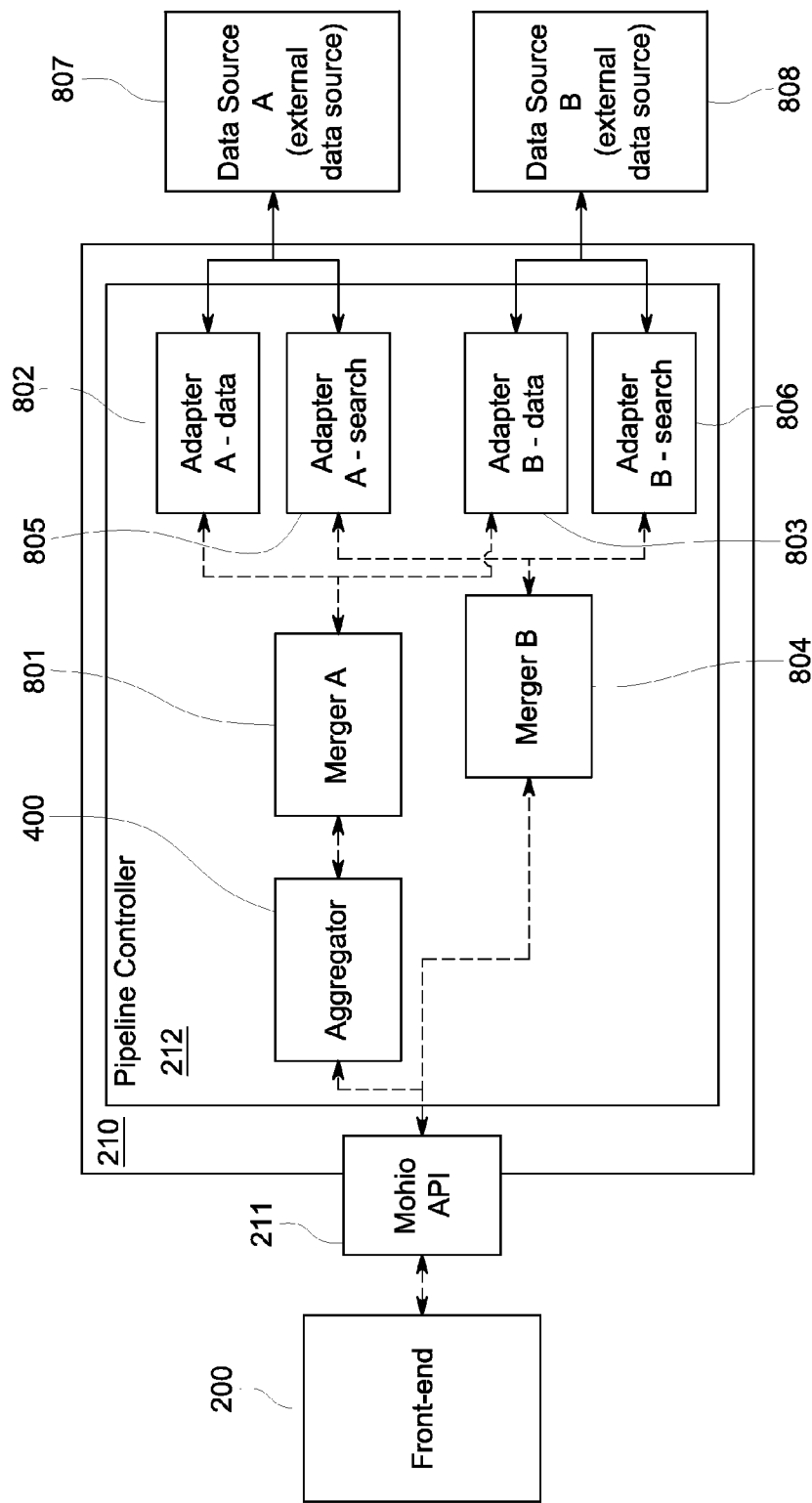
Figure 9A:
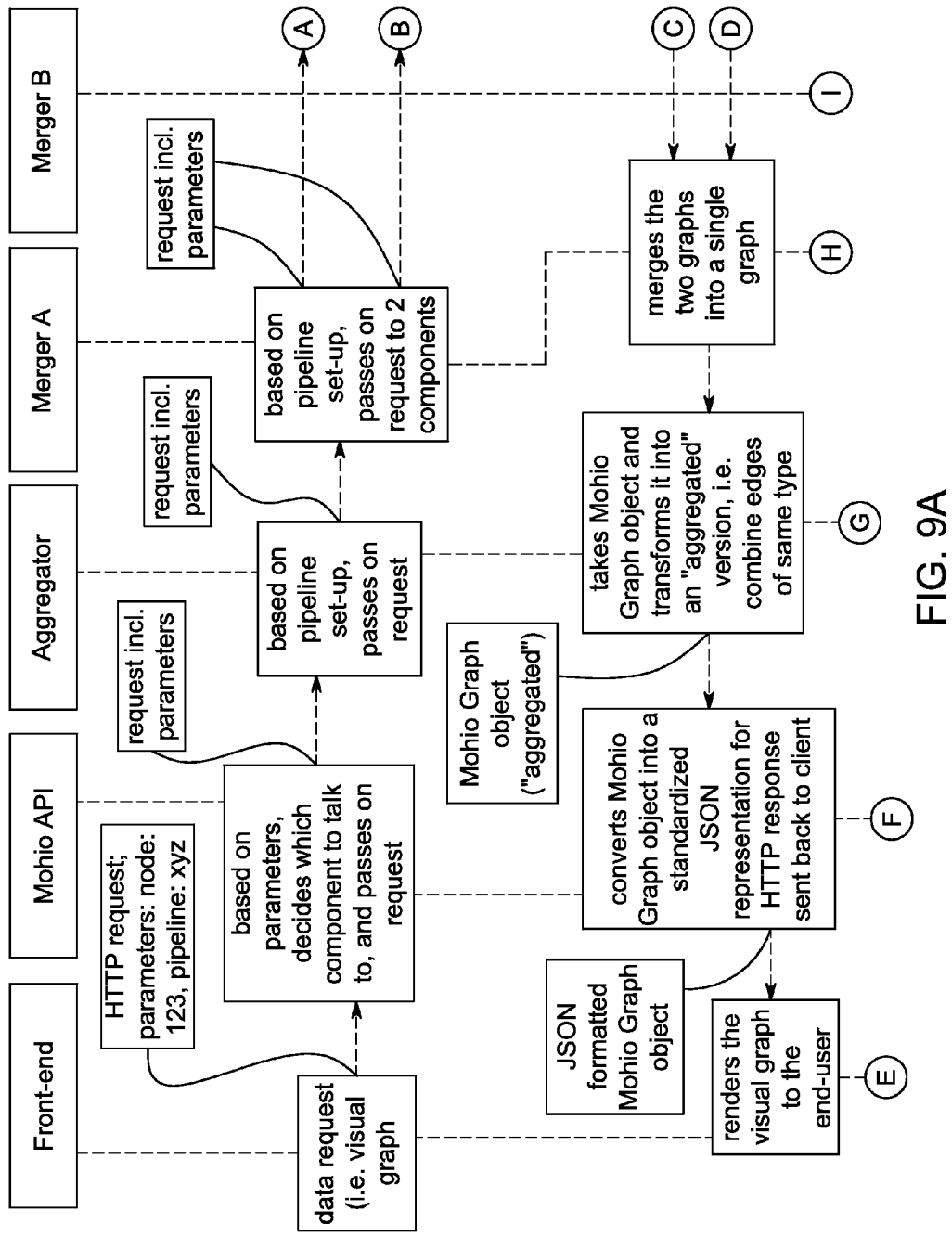
FIG. 9A-9D is a data flow diagram illustrating an example sequence of events performed by the system of FIG. 8.
Figure 9B:
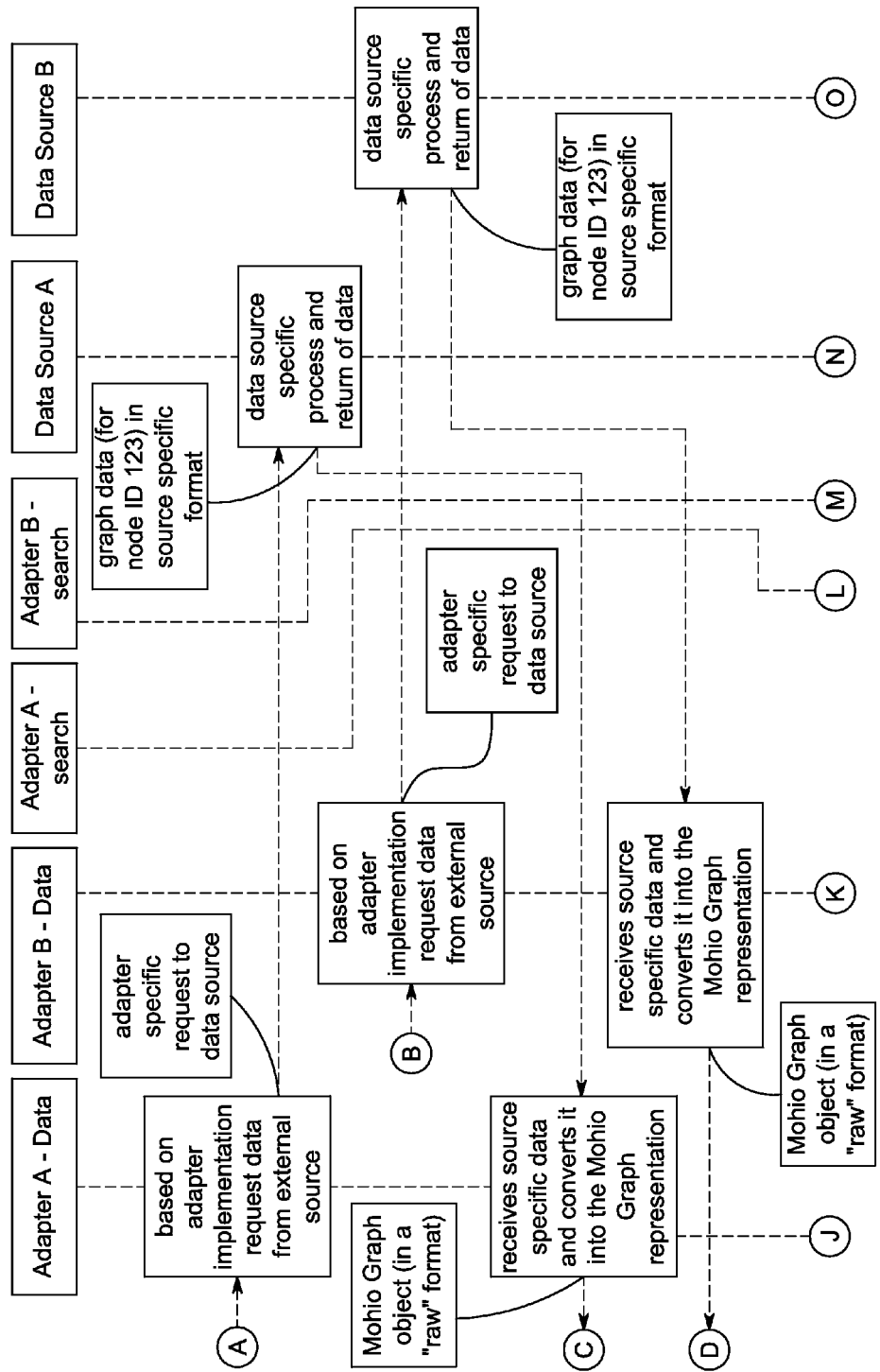
Figure 9C:
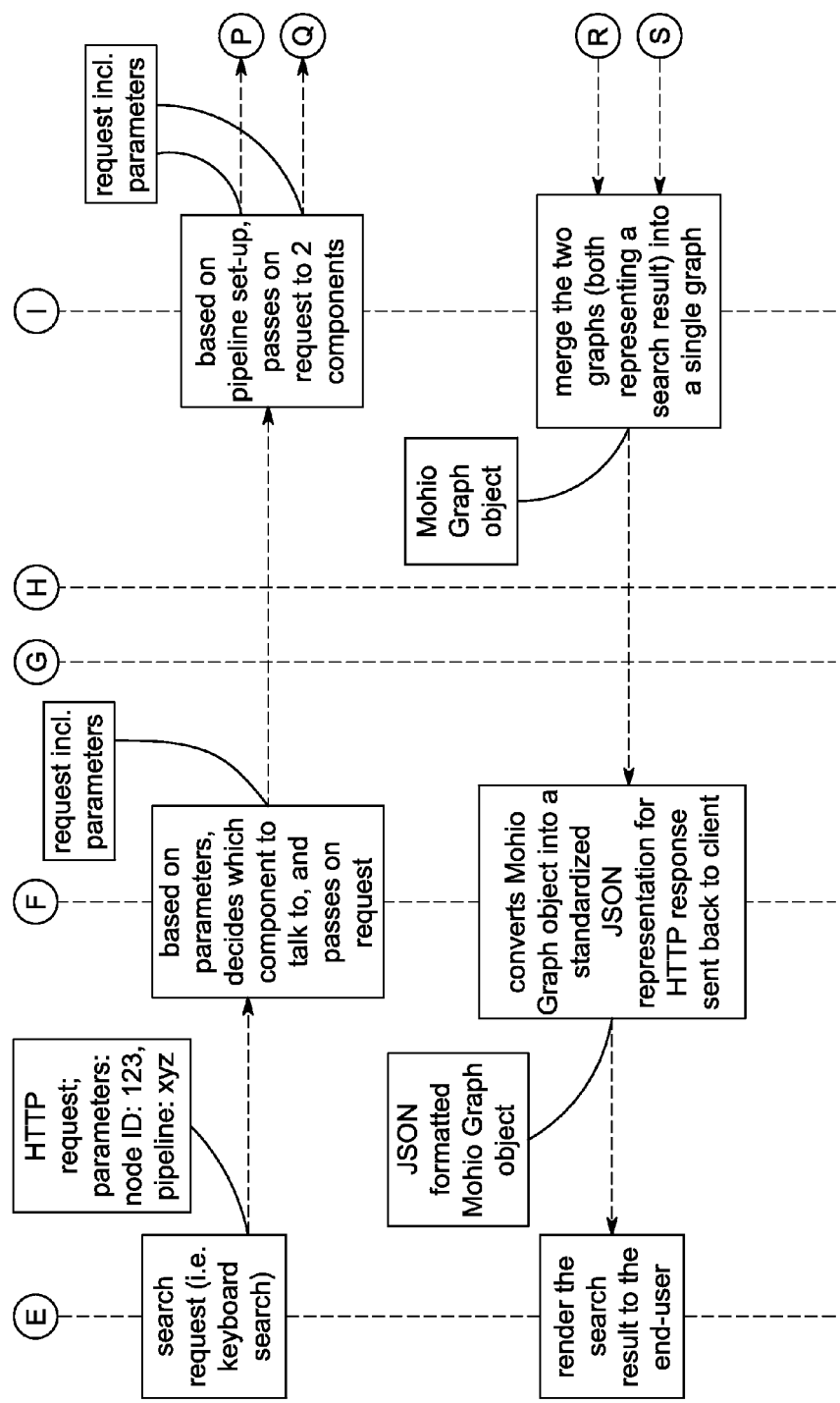
Figure 9D:
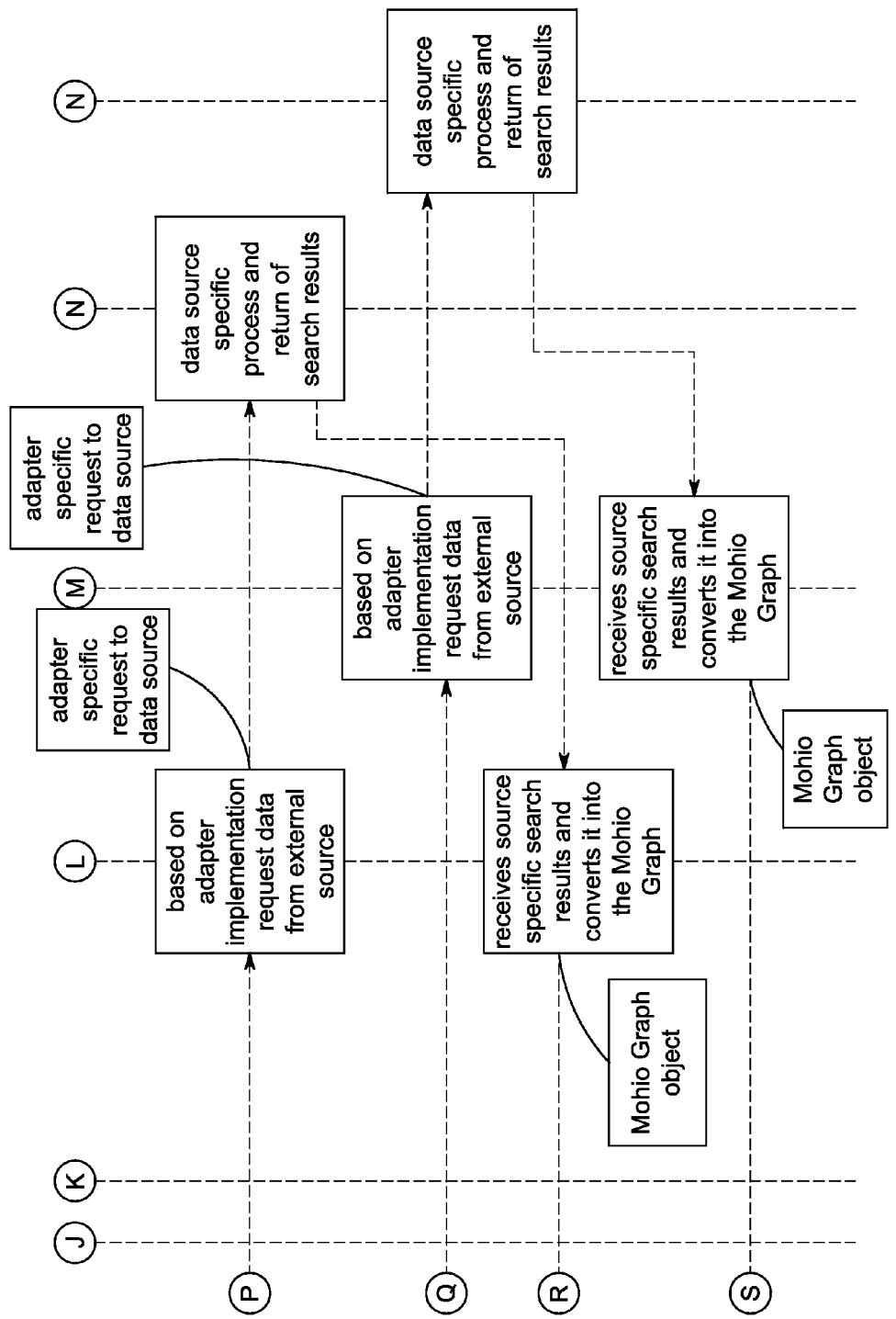

Another example embodiment of a system according to the present invention is illustrated in the system diagram of FIG. 8. In this example, the back-end sub-system 210 again comprises two pipelines. However, the first pipeline in this example comprises a pair of components, aggregator 400 and merger 801, and a pair of adapters, data adapters 802 and 803. The second pipeline comprises a single component, merger 804, and a pair of adapters, search adapters 805 and 806.

The back-end system 210 in this example is adapted to communicate with a pair of data sources 807 and 808. The data adapters 802 and 803 of the first pipeline are adapted to interface with data sources 807 and 808, respectively, while the search adapters 805 and 806 of the second pipeline are similarly adapted to interface with the respective data sources, which may provide data in different formats.

Merger components 801 and 804 are adapted to combine or merge the data/search results (in the form of graph objects) received from the respective adapters into a single graph object, thereby enabling the front-end 200 to seamlessly display a graph or search results comprising data extracted from both data sources.

A sequence diagram for the above events is provided in FIG. 9.

In preferred embodiments of the invention, the pipeline structure can be customized or reconfigured by an administrator or user by modifying existing pipelines or adding a new pipeline. The structure may be pre-determined by or pre-configured for the specific application of the system, but is preferably at least partly reconfigurable or extendable by either an administrator or use, for example.

The pipeline structure (that is, the particular component software modules and the order or sequence thereof) of a system according to the present invention may be defined and configured by way of a properties file (pipeline properties file 230 of FIG. 1), for example. The system may therefore be easily reconfigured or customized by an experienced user or administrator.

A simplified example of such a properties file for the system of FIG. 7 is shown below for illustrative purposes in a JSON format:

```
{
    "configurations": {
        "requireKey": "true",
        "defaultPipeline": "mohioactdata",
        "verbosity": "10",
        "database": "mohioact",
        "dbUser": "root",
        "dbPass": "pass",
        "sessionTimeout": "180",
        "serverPath" : "/Mohio"
    },
    "pipeline": [
        {
            "ID": "mohioactdata",
            "entry": "mohioactdata"
        },
        {
            "ID": "mohioactsearch",
            "entry": "mohioactsearch"
        }
    ],
    "module": [
        {
            "ID": "mohioactdata",
            "classID": "ActAdapter"
        },
        {
            "ID": "mohioactsearch",
            "classID": "SeachCompont"
        }
    ]
}
```

It can be seen that this properties file defines the two pipelines and adapter components of the system of FIG. 7. The components may be selected from a library of available modular components, or defined by the user.

It is to be appreciated that the structure and contents of the property file is not limited to the examples provided herein. The properties file is similarly not intended to be limited to the JSON format of the examples. A more complex example comprising an aggregation component as well as separate annotation and table of content (toc) components in four pipelines is shown below:

```
{
    "configurations": {
        "requireKey": "true",
        "defaultPipeline": "freebasepipeline",
        "verbosity": "10",
        "database": "mohiocore",
        "dbUser": "root",
        "dbPass": "pass",
        "sessionTimeout": "180",
        "serverPath" : "/Mohio"
    },
    "pipeline": [
        {
            "ID": "freebasepipeline",
            "entry": "aggregator"
        },
        {
            "ID": "annotation",
            "entry": "annotation"
        },
        {
            "ID": "toc",
            "entry": "toc"
        },
        {
            "ID": "search",
```

```
        "entry": "search"
      }
    ],
    "module": [
      {
        "ID": "aggregator",
        "classID": "Aggregator",
        "init-param": [
          {
            "name": "name",
            "value": "val"
          }
        ],
        "next": [
          {
            "nextID": "freebaseadapter"
          }
        ]
      },
      {
        "ID": "freebaseadapter",
        "classID": "FreebaseAdapter"
      },
      {
        "ID": "annotation",
        "classID": "AnnotationHandler"
      },
      {
        "ID": "toc",
        "classID": "TOCHandler"
      },
      {
        "ID": "search",
        "classID":
          "core.pipeline.component.search.SearchComponent"
      }
    ]
}
```

Alternatively, the configuration of the system may be made more accessible to end-users, such as via the client software 201 of the front-end sub-system 200, enabling users themselves to configure pipelines as required, at least within certain boundaries. Instead of the manual configuration via a property file, this feature allows for a more convenient configuration by way of a configuration page in the client application, for example, which provides a form- or graph-based interface to modify at least some of the properties. The configuration interface may comprise a visual configuration tool, for example, whereby users may drag and drop component software modules from a library into at least one of the one or more pipelines, thereby modifying the selection or sequence of component software modules without the need for any programming.

The pipeline configuration data itself is suitable for being treated as another data source which could be edited collaboratively (through the user interface). A pipeline configuration can easily be represented using a graph structure, in which each node would represent a component of the pipeline and the edges represent the sequence of the components. This would permit representation/editing/creation/modification of pipelines within the graphical user interface of the application itself, similar to that shown in FIG. 1 (albeit with fewer nodes) for example. The nodes of the graph thus need not necessarily represent a topic as in the previous examples, but may represent any relevant item such as a component of a pipeline. A component software module may be added to a pipeline as a new node, and the sequence of component software modules may be modified by creating new edges or changing the existing edges, for example.

The configurability of the present invention, in particular with an integrated graphical user interface for end-user or administrator configuration of the pipelines, supports different types of application deployment and business models, enabling an administrator or end user to easily and quickly manipulate the pipeline structure, and therefore the logic and functionality of the overall system. For example, the configurable pipelines provide a convenient way for the system provider to customize client applications, reducing the time required to set up new applications and increase the turnaround; an administration feature giving a client's administrator(s) certain modification rights to the pipelines to customize the system to meet their requirements; and/or a premium feature for end-users to have configuration control over parts (or all) of their pipelines.

A system and/or server-side computer program according to the present invention thus preferably comprises a set or library of standard modular, re-usable, components 218 which can be selected and arranged into the required pipeline configuration. The architecture also allows for more components to be added to the standard library, including components customized only to fulfill a specific functionality (i.e. a one-off component fulfilling a unique user need).

Three common types of such modular pipeline components are described in further detail below by way of non-limiting example.

Figure 10:
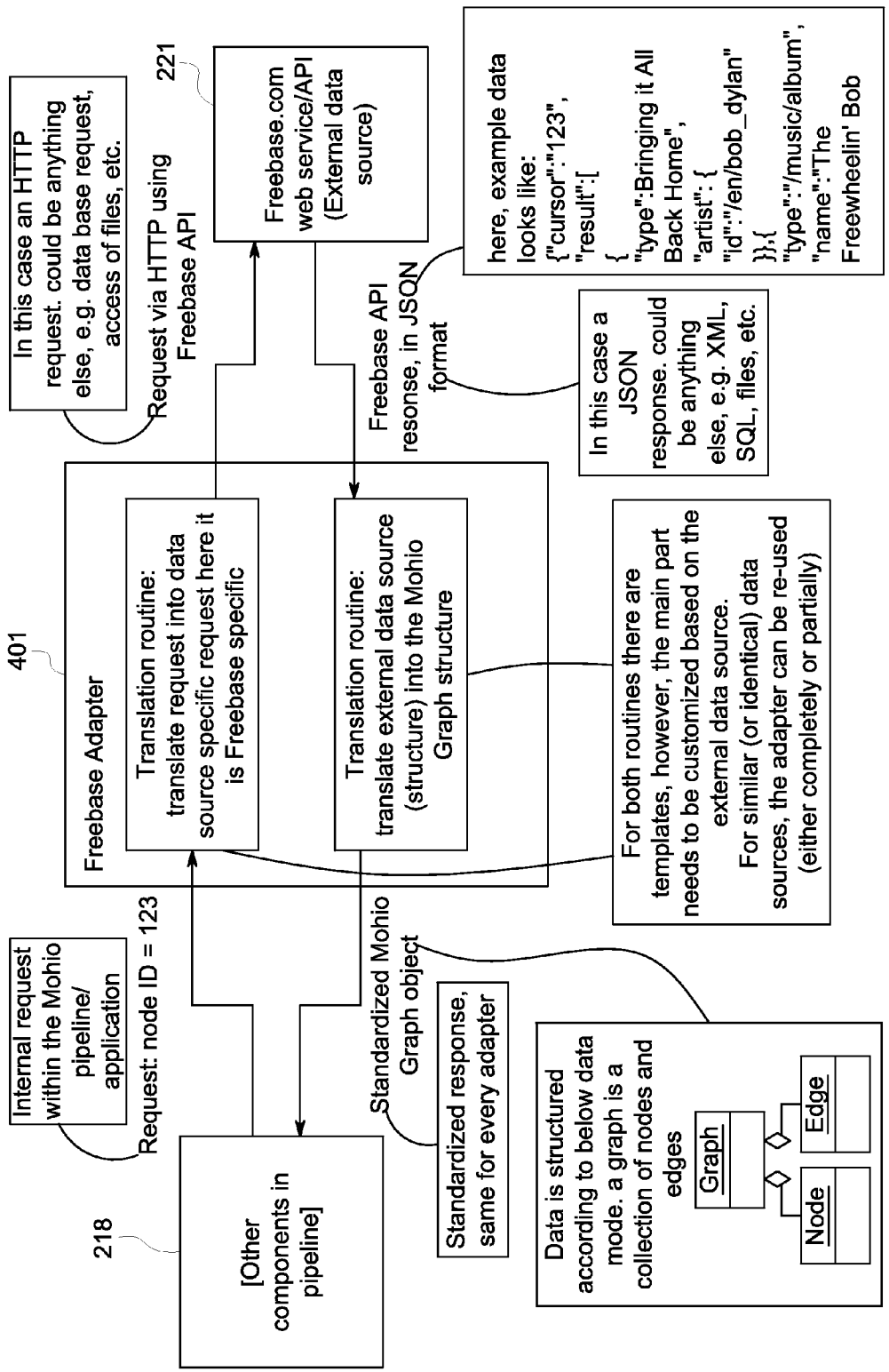
FIG. 10 is a diagram illustrating the functions of a Freebase adapter according to the invention.

FIG. 10 generally illustrates an example of an adapter component. Adapters are one of the key components and have the main functionality of handling communications between the back-end 210 and external data sources 220. Each adapter is generally unique to each different data source, and any data received externally is processed by the adapter into the internal common data structure (e.g. the graph object of FIG. 3), and then sent back to the previous component in the pipeline (or the pipeline controller 212 or API 211, as appropriate).

Each adapter (for a specific data source) needs to be customized for the associated data source. The example of FIG. 10 comprises the Freebase adapter 401 of FIG. 4, for example, which is customized for interacting with the Freebase data source. In particular, the Freebase adapter receives and translates a request into the appropriate format, which in the case of Freebase comprises an HTTP request using the Freebase API. In other adapters, the request may be translated to a database query of the appropriate format (e.g. structured query language or SQL), for example. The response received from Freebase is in the JSON format, which is translated by the Freebase adapter to the standardized graph object which is passed on to the next component in the pipeline. In other adapters, the response received from the data source may be in an HTML or XML format, for example.

The adapter components may also rank the nodes of the graph object. Depending on the underlying data source, this could be based on properties retrieved from the source (or from properties inferred by the adapter). Alternatively, specific "ranking" components may be added to the pipeline to perform this function, in particular before a threshold component to ensure that only the most relevant nodes are displayed to the user.

Although the adapter components described above are directed primarily towards retrieving data from external data sources ("read" queries), at least some embodiments of the invention may also involve the use of adapter components capable of writing data to a data source ("write" queries). The pipeline structure thus also supports manipulation (editing) of data via the user interface. The client-side graph display is not only interactive, but also allows the end user to perform certain editing tasks, such as moving, renaming, deleting, and creation of new connection/edges and/or nodes. These editing functionalities are handled by the pipeline architecture in the same way as the query requests, wherein certain instructions (such as "create a new connection between node A and B") are passed on via the query parameters. Different components of the pipeline are then capable of handling this request and sending it to a "write" adapter component, which is capable of writing that requested change to the original data source.

Figure 11:
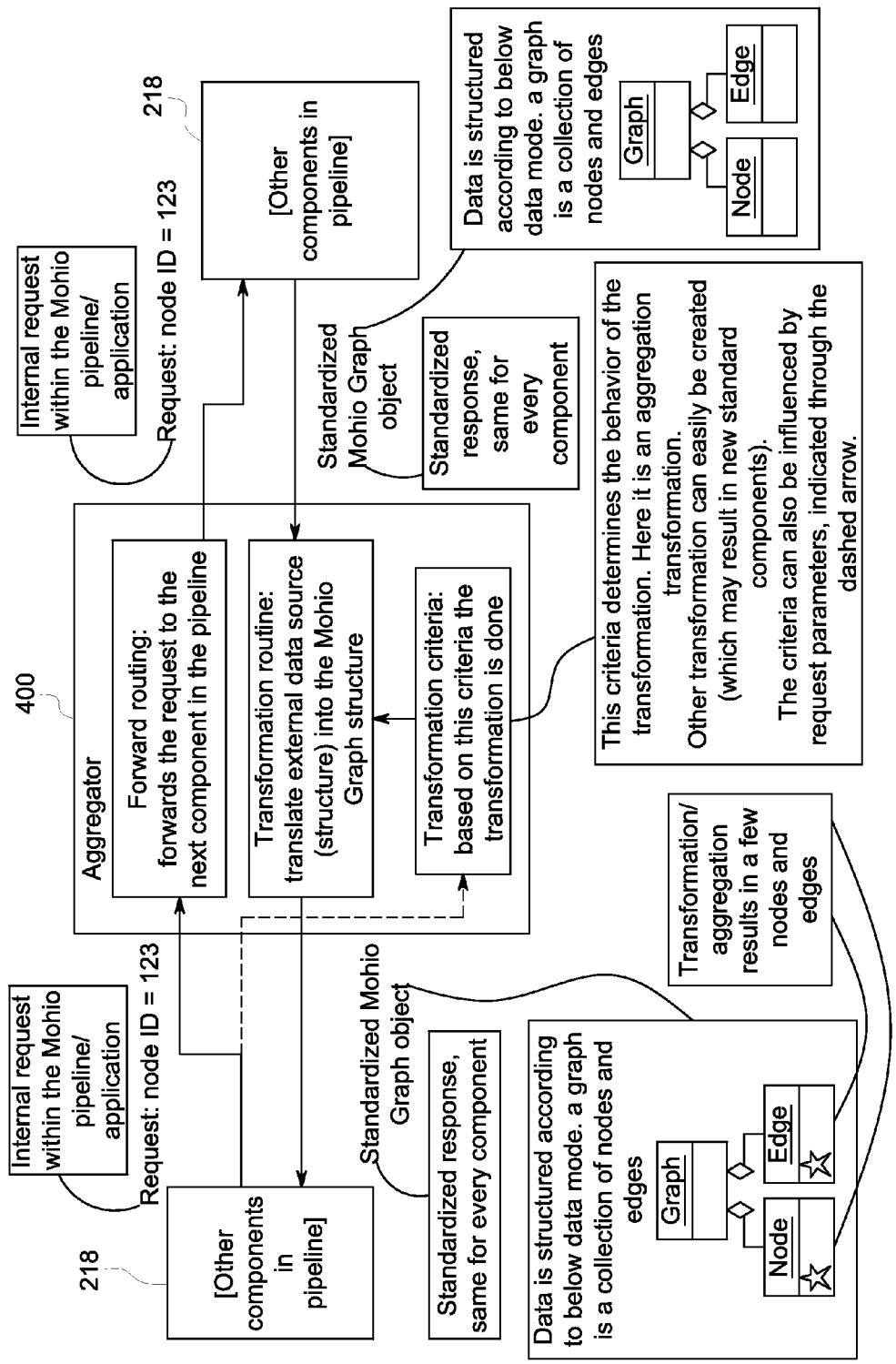
FIG. 11 is a diagram illustrating the functions of an aggregator component according to the invention.

FIG. 11 illustrates in further detail the aggregator component 400 as utilized in the embodiments of FIGS. 4 and 8, for example. The aggregator component 400 is a relatively simple component that manipulates the graph data it receives (from the adapter 401, for example) and groups together all sets of nodes that are connected by the same type of edges (i.e. a set of nodes which are connected to edges, which in turn have one or multiple common properties which may be predefined, and/or editable/influenced by an end-user, either directly or indirectly). It automatically iterates through every level of the received graph object and handles every edge type, therefore no customization is generally required and can be plugged into any pipeline and readily re-used.

A threshold component may be used to limit the number of children nodes a parent node can have. A default value can be set (e.g. 10), and the limit can be specified in the pipeline configuration file 230 (or, potentially, via an end-user configuration interface). When the threshold component receives a graph object, it goes through each node, counts the number of children, and discards any after the first 10 (or whatever amount is specified). The reduced graph is then sent to the next component in the pipeline. Again, no customisation of the threshold component itself is required, and it can therefore be readily re-used.

Annotation components may enable the user to make, submit, and search annotations relating to a selected topic, adding to the retrievable information. Access to the annotations may be limited to the user who submits it, or made available to selected other users or all users. The annotations may be submitted to the data source from which the related topic is originally retrieved, or stored in a separate database and combined with information from the original topic source using a merger component, for example.

The system preferably enables users to save or bookmark their search for later viewing or sharing with other viewers.

The above component software modules are merely examples of the types of components that may be selected from a library or created by a user to obtain a pipeline having the required functionality. Other component software modules may also be created or provided in the library without departing from the scope of the invention. However, the component software modules of the present invention share in common the feature that they are adapted to receive data, modify the data by performing at least one predefined function, and pass the modified data to the next module (or the pipeline controller, API, or similar where the module is last in the pipeline sequence). The aggregate, rank, merge, threshold, and annotation functions described previously are merely a few examples of the many possible functions which may be performed by component software modules of the present invention.

From the foregoing, it will be apparent that the present invention provides novel and intuitive methods for the visualization and navigation of information, and the customization of the displayed information through the modular pipeline architecture. Those skilled in the art will appreciate that the methods of the invention, or parts thereof, are intended to be performed by general purpose digital computing devices, such as desktop or laptop personal computers, mobile devices (including smartphones and tablet computers), servers, and/or combinations thereof communicatively coupled in a wired and/or wireless network including a LAN, wide area network (WAN), and/or the Internet. In particular, the system is preferably implemented using a client-server architecture as described above, in which the front-end of the system comprises a client computer system and the back-end comprises a server computer system, whereby a user preferably interacts with a browser-based graphical user interface presented on a visual display of the client computer system, which displays relevant information upon communication with the server computer system. Alternative architectures are possible without departing from the scope of the invention, however.

Once programmed to perform particular functions pursuant to instructions from program software that implements the method of this invention, such digital computer systems in effect become special-purpose computers particular to the method of this invention. The techniques necessary for this are well-known to those skilled in the art of computer systems.

Computer programs implementing the method of this invention may be distributed to users on a computer-readable distribution medium such as CD-ROM or flash drive. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses non-transitory distribution media, non-volatile intermediate storage media, volatile execution memory of a computer, and any other non-transitory medium or device capable of storing for later reading by a computer a computer program implementing the method of this invention, excluding only transitory propagating waves or signals.

From the foregoing it will be seen that the present invention provides methods, computer programs, and systems for providing a graph-based graphical user interface for conveniently and intuitively visualizing and navigating information regarding a range of related topics.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention.

In particular, although the example interfaces of FIGS. 1 and 6 display information in a mind-map-like graph comprising a plurality of linked or connected nodes showing the contextual relationship between information, in other embodiments the information may be presented in alternative diagrammatic forms as appropriate for the selected topic or selected by the user. For example, the information may alternatively be displayed on a timeline or a geographic map representing the temporal or spatial relationship between the information. Other relationships may be similarly represented visually without departing from the scope of the invention.

The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A networked computer system for retrieving and displaying information, the system comprising:
   a front-end sub-system comprising a processor for receiving a user query, generating and transmitting a request, and displaying a response to the user; and
   a back-end sub-system in communication with the front-end sub-system and comprising a processor for receiving the request, extracting data from one or more data sources based on the request, processing said extracted data into a predefined format, and transmitting said processed data to the front-end for display to the user in response to the request,
   wherein the back-end sub-system comprises one or more selectable pipelines for processing the request, each pipeline comprising one or more component software modules selected from a library of modular component software modules having predefined functions or created by a user to cooperate in extracting and processing the extracted data, wherein at least one of the one or more pipelines may be customized by modifying either or both of a selection or sequence of the component software modules.

2. The networked computer system of claim 1, wherein the front-end is adapted to display the processed data diagrammatically in an interactive graphical user interface comprising a plurality of nodes, each node graphically representing a corresponding item relating to the user query, and said nodes being arranged in relation to one another to reflect a relationship between said items, wherein each of said nodes are selectable by the user to display information or further items related to the selected node.

3. The networked computer system of claim 2 wherein said items comprise topics, and said nodes are arranged in relation to one another to reflect the contextual relationship between said topics.

4. The networked computer system of claim 1 wherein the library comprises a plurality of component software modules comprising any one or more of:
   aggregator component modules, which manipulate the extracted data to group together related data;
   merger component modules which merge data from two or more data sources;
   threshold component modules which limit a volume of extracted data to be displayed to the user; and
   adapter component modules which communicate with an external data source, and convert data between a format of the data source and the predefined format.

5. The networked computer system of claim 1, wherein at least one of the one or more component software modules comprises an adapter component module adapted to communicate with a data source by transmitting a query and receiving said extracted data in respective predetermined formats of the data source, and to convert said extracted data into the predefined format for further processing by the back-end sub-system.

6. The networked computer system of claim 1 wherein the back-end sub-system comprises a plurality of pipelines each providing a different function determined by a respective selection and sequence of component software modules.

7. The networked computer system of claim 1 wherein the one or more pipelines may be customized by a user editing a pipeline configuration file or by accessing a configuration interface from the front-end sub-system.

8. The networked computer system of claim 1 wherein the back-end sub-system is further adapted to write data to at least one of the one or more data sources.

9. A server computer system for retrieving and transmitting information relating to a user query received from a client computer system, comprising a processor programmed to receive the user query, extract data from one or more data sources based on the user query, process said extracted data into a predefined format, and transmit said processed data to the client computer system for display to the user in response to the query, wherein the server computer system comprises one or more selectable pipelines for processing the user query, each pipeline comprising one or more component software modules selected from a library of modular component software modules or created by a user to cooperate in extracting and processing the extracted data, and at least one of the one or more pipelines may be customized by modifying either or both of a selection or sequence of the one or more component software modules.

10. The server computer system of claim 9 wherein the library comprises a plurality of component software modules from a group consisting of:
    aggregator component modules, which manipulate the extracted data to group together related data;
    merger component modules which merge data from two or more data sources;
    threshold component modules which limit a volume of extracted data to be displayed to the user; and
    adapter component modules which communicate with an external data source, and convert data between a format of the data source and the predefined format.

11. The server computer system of claim 9 wherein at least one of the one or more component software modules comprises an adapter module adapted to communicate with a data source by transmitting said query and receiving said extracted data in respective predetermined formats of the data source, and to convert said extracted data into the predefined format for further processing by the back-end sub-system.

12. The server computer system of claim 9 wherein the back-end sub-system comprises a plurality of pipelines, and each pipeline has a different function determined by the selection and sequence of component software modules.

13. The server computer system of claim 9 wherein the one or more pipelines may be customized by editing a pipeline configuration file or by accessing a configuration interface from the client computer system.

14. The server computer system of claim 9, wherein the predefined format comprises a graph object comprising one or more node objects and one or more edge objects to facilitate display of a visual representation of the processed data in a graph by the client computer system.

15. The server computer system of claim 9 wherein the processor is further programmed to edit at least one of the one or more data sources in response to the user query.

16. A client computer system for retrieving and displaying information from a server computer system, comprising a processor programmed to receive a user query via a human interface device, generate and transmit a request to the server computer system, and receive and display a response from the server computer system to the user, wherein the server computer system comprises one or more selectable pipelines for processing the user query, each pipeline comprising one or more component software modules selected from a library of modular component software modules or created by a user to cooperate in processing the user query, and the client computer system provides an interface for customizing at least one of the one or more pipelines by modifying either or both of a selection or sequence of the one or more component software modules.

17. The client computer system of claim 16 further programmed to select at least one of the one or more selectable pipelines to process the user query.

18. The client computer system of claim 16 further programmed to display a graphical user interface to the user representing a structure of at least one of the one or more pipelines, and allowing the user to modify either or both of the selection or sequence of the one or more component modules.

19. The client computer system of claim 16 programmed to display the processed data diagrammatically in an interactive graphical user interface comprising a plurality of nodes, each node graphically representing a corresponding item relating to the user query, said nodes being arranged in relation to one another to reflect a relationship between said items, and each of said nodes are selectable by the user to display information or further items related to the selected node.

20. The client computer system of claim 16 wherein the interface for customizing at least one of the one or more pipelines comprises the graphical user interface, and each of the component software modules is represented by a node.

21. A method performed by the server computer system according to claim 9, the method comprising steps of:

receiving, via a network communication device, a request from a client computer system communicatively coupled with the server computer system;

using a processor of the server computer system, selecting one of one or more pipelines for processing the request, wherein said pipelines each comprise one or more component software modules having predefined functions selected from a library of modular component software modules or created by a user, the functionality of each pipeline being dependent upon either or both of a selection or sequence of the one or more component software modules, which may be customized by the user;

using the selected pipeline to extract data from one or more data sources based on the request;

using the selected pipeline to process said extracted data into a predefined format; and transmitting said processed data to the client computer system for display to the user in response to the user query.

22. The method of claim 21, further comprising receiving customization instructions from the client computer system, and modifying either or both of a selection or sequence of the one or more component software modules of at least one pipeline.

23. The method of claim 21, wherein processing the extracted data comprises at least receiving said extracted data in a predetermined format of the data source, and converting said extracted data into the predefined format.

24. A non-transitory computer-readable medium containing program instructions which cause a computer to perform the method of claim 21.

* * * * *

UNITED STATES PATENT AND TRADEMARK OFFICE
CERTIFICATE OF CORRECTION

PATENT NO.         : 9,342,908 B2                                    Page 1 of 1
APPLICATION NO.    : 14/047631
DATED              : May 17, 2016
INVENTOR(S)        : Christian Hirsch et al.

It is certified that error appears in the above-identified patent and that said Letters Patent is hereby corrected as shown below:

On the title page item (71) Applicant, Change "Mohio Limited, Auckland (NZ)" to

--Auckland Uniservices Limited, Auckland (NZ)--

Signed and Sealed this
Twenty-sixth Day of July, 2016

Michelle K. Lee
*Director of the United States Patent and Trademark Office*